No. 712,054. Patented Oct. 28, 1902.
E. FONTAINE.
NEEDLE MAKING MACHINE.
(Application filed Jan. 23, 1899.)

(No Model.) 21 Sheets—Sheet 1.

Witnesses.
Edward T. Wray.
Harry L. White.

Inventor.
Eugene Fontaine
by Burton and Burton
his attys.

No. 712,054. Patented Oct. 28, 1902.
E. FONTAINE.
NEEDLE MAKING MACHINE.
(Application filed Jan. 23, 1899.)
(No Model.) 21 Sheets—Sheet 2.

Witnesses:
Edward T. Wray.

Inventor:
Eugene Fontaine
by Burton and Burton
his atty.

No. 712,054. Patented Oct. 28, 1902.
E. FONTAINE.
NEEDLE MAKING MACHINE.
(Application filed Jan. 23, 1899.)
(No Model.) 21 Sheets—Sheet 3.
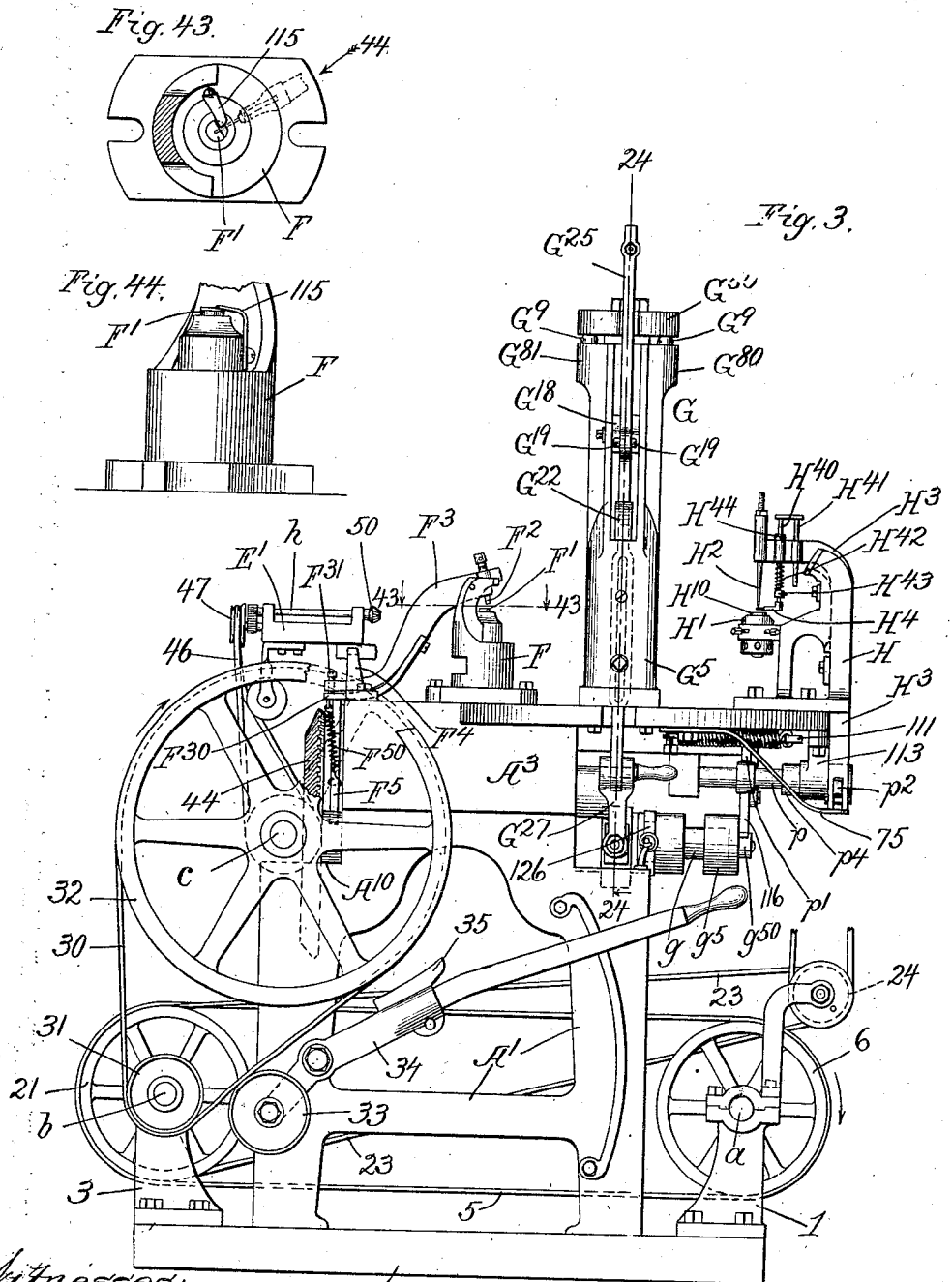
Witnesses:
Edward T. Wray.
Harry B. White.
Inventor:
Eugene Fontaine
by Burton and Burton
his Attys

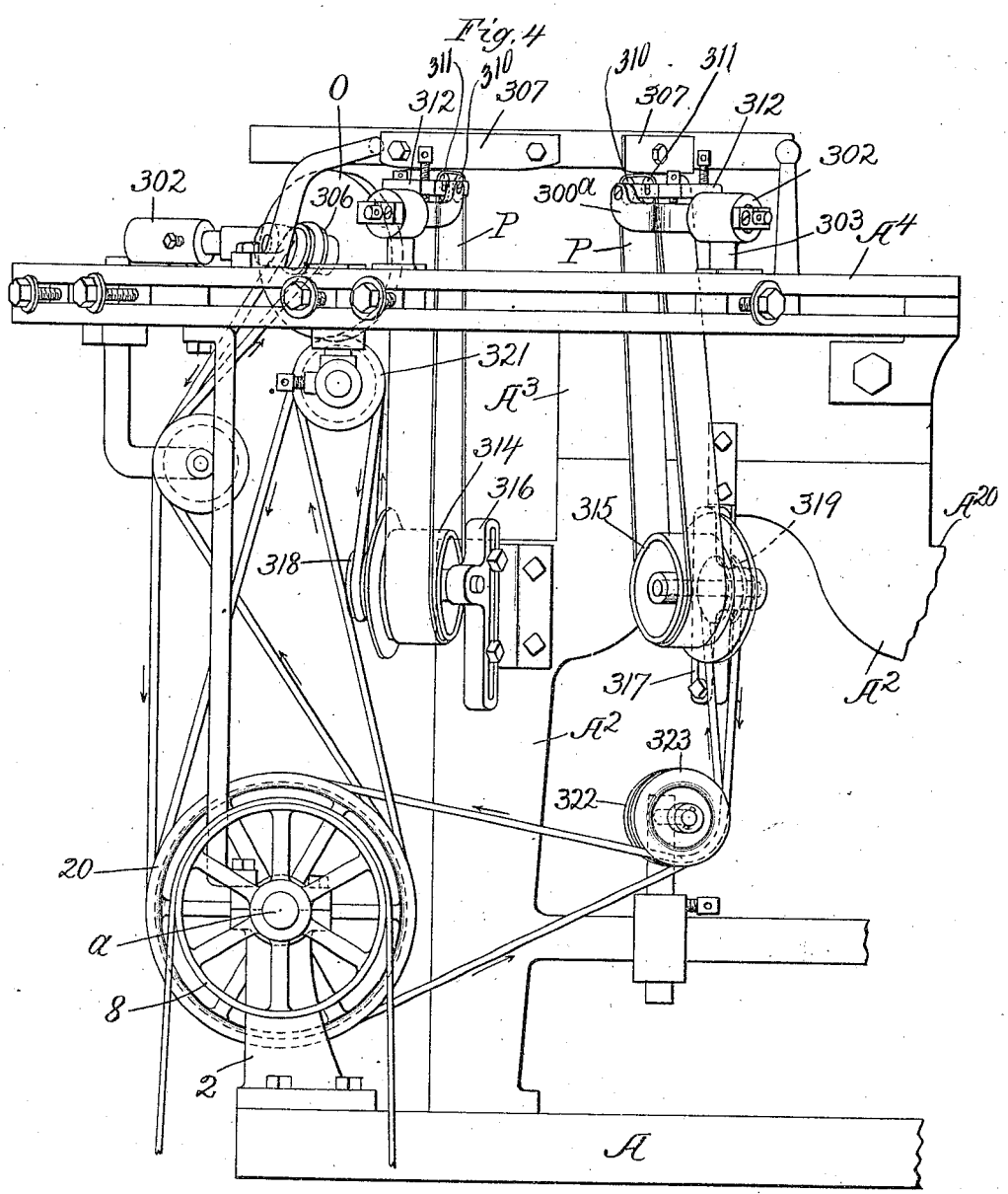

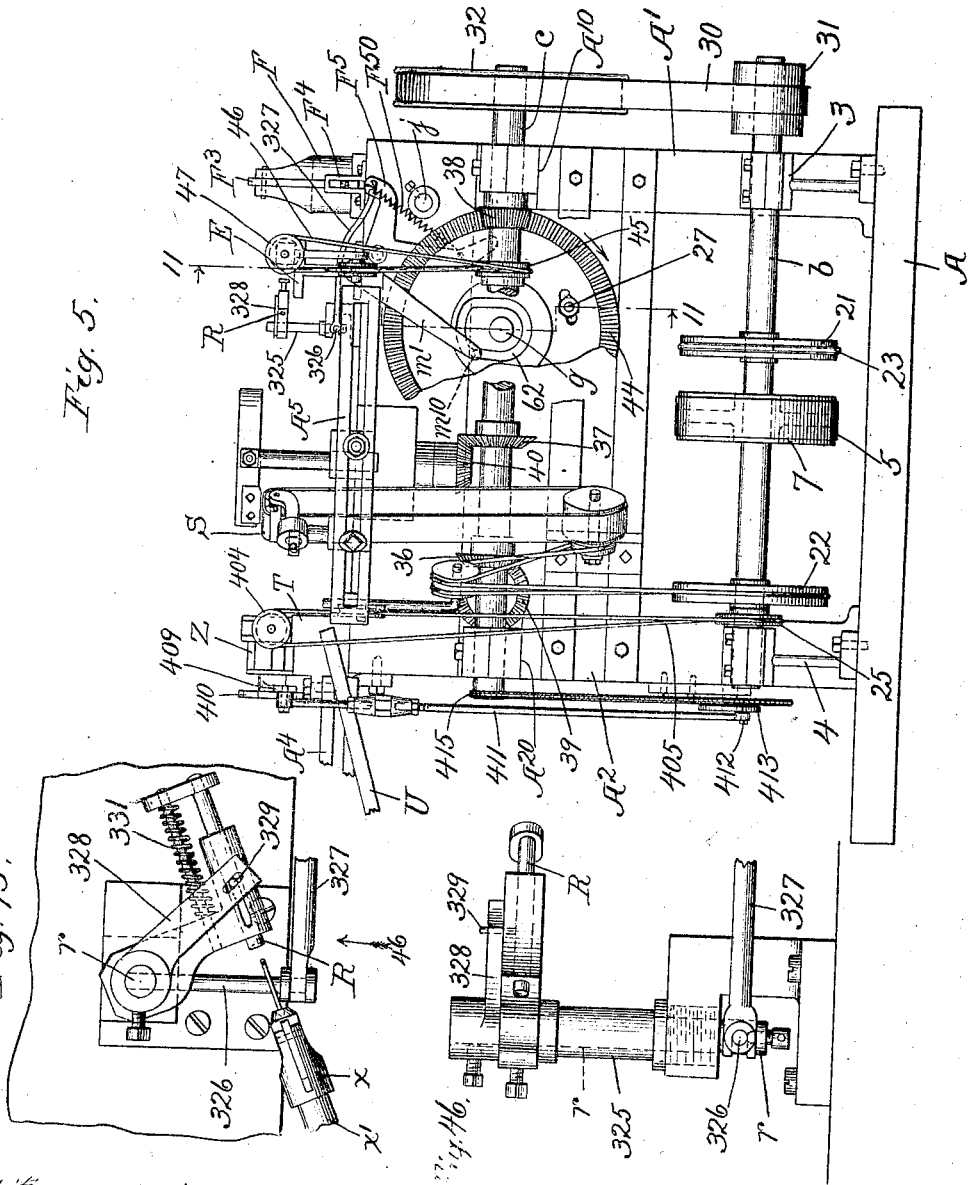

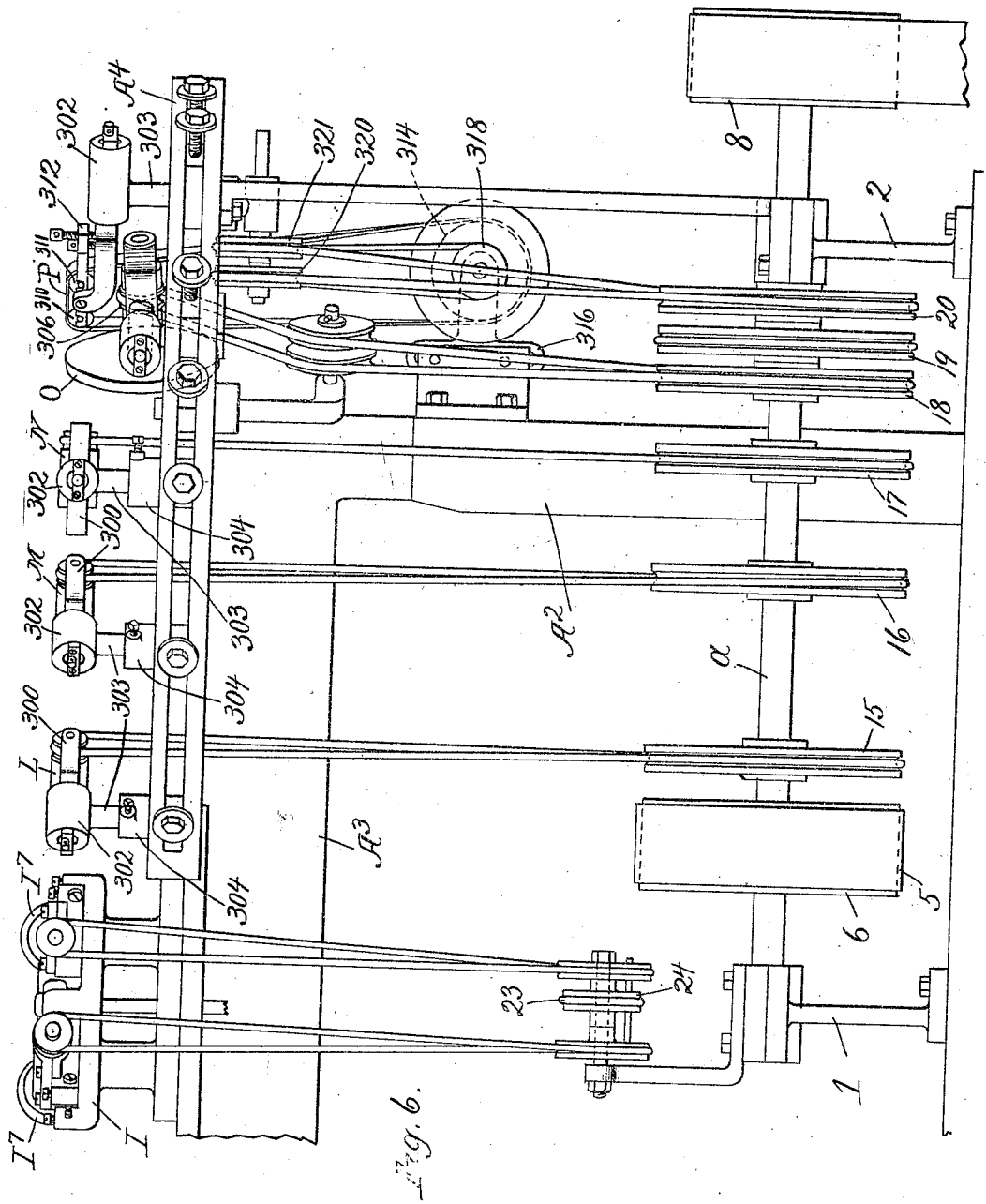

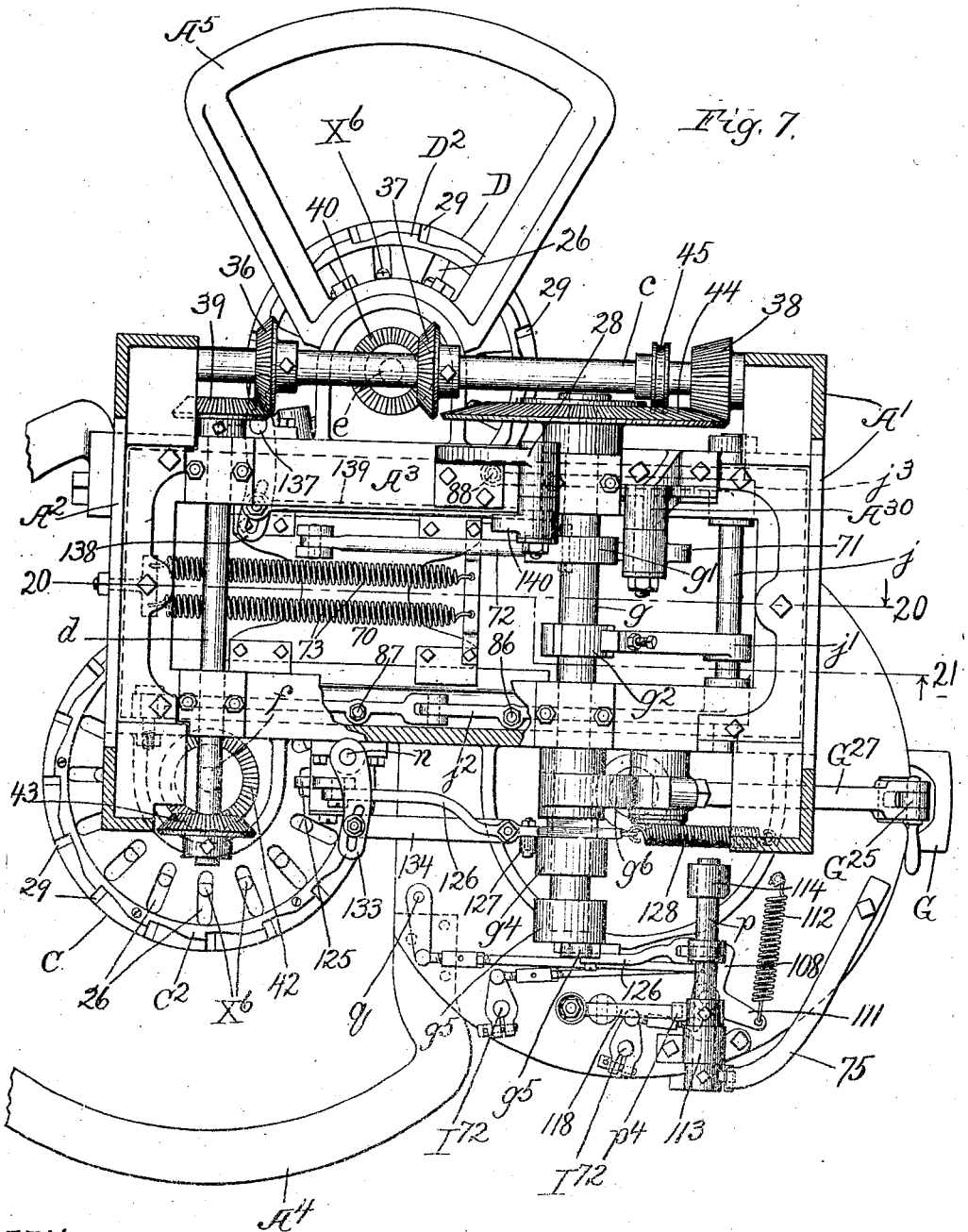

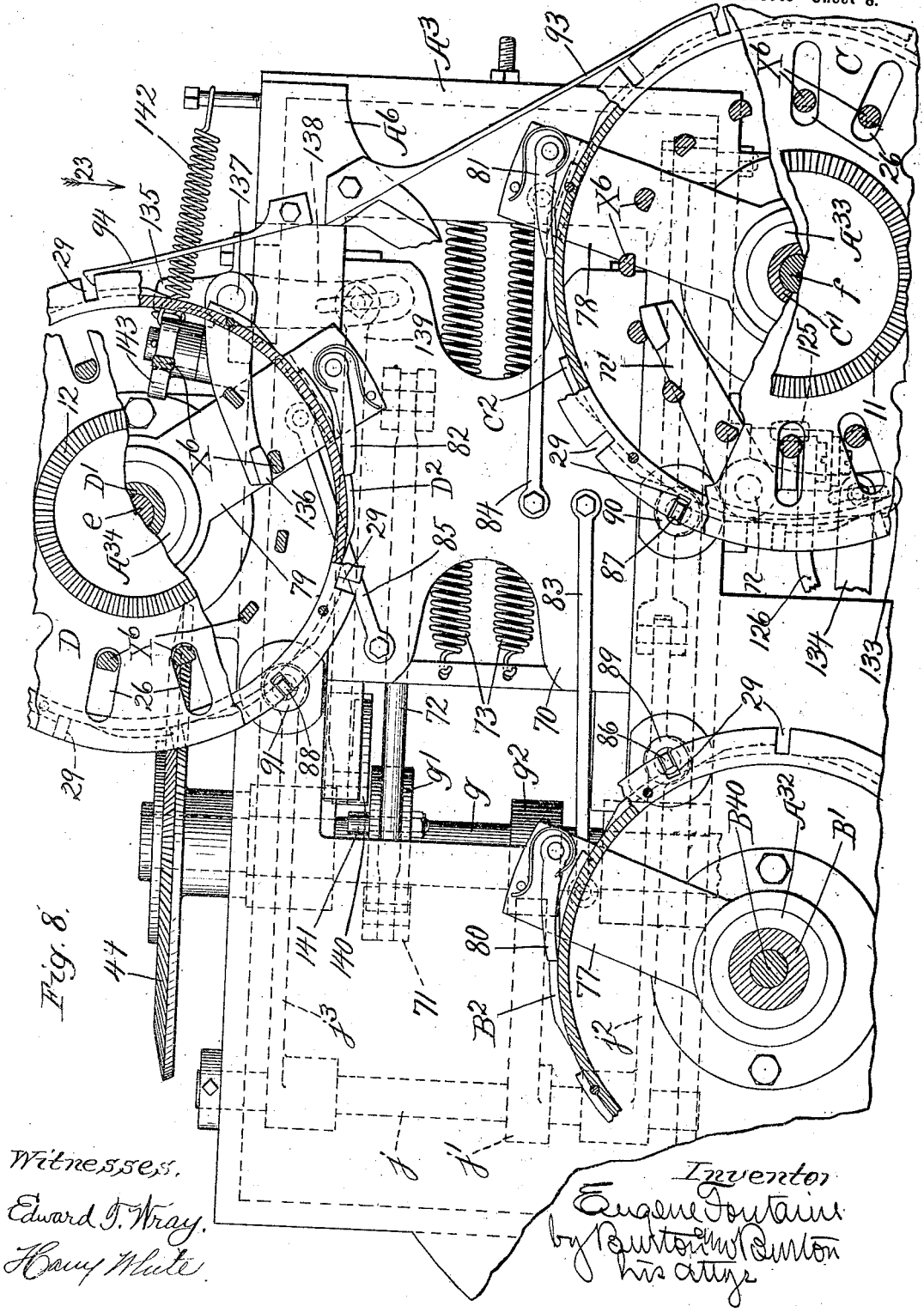

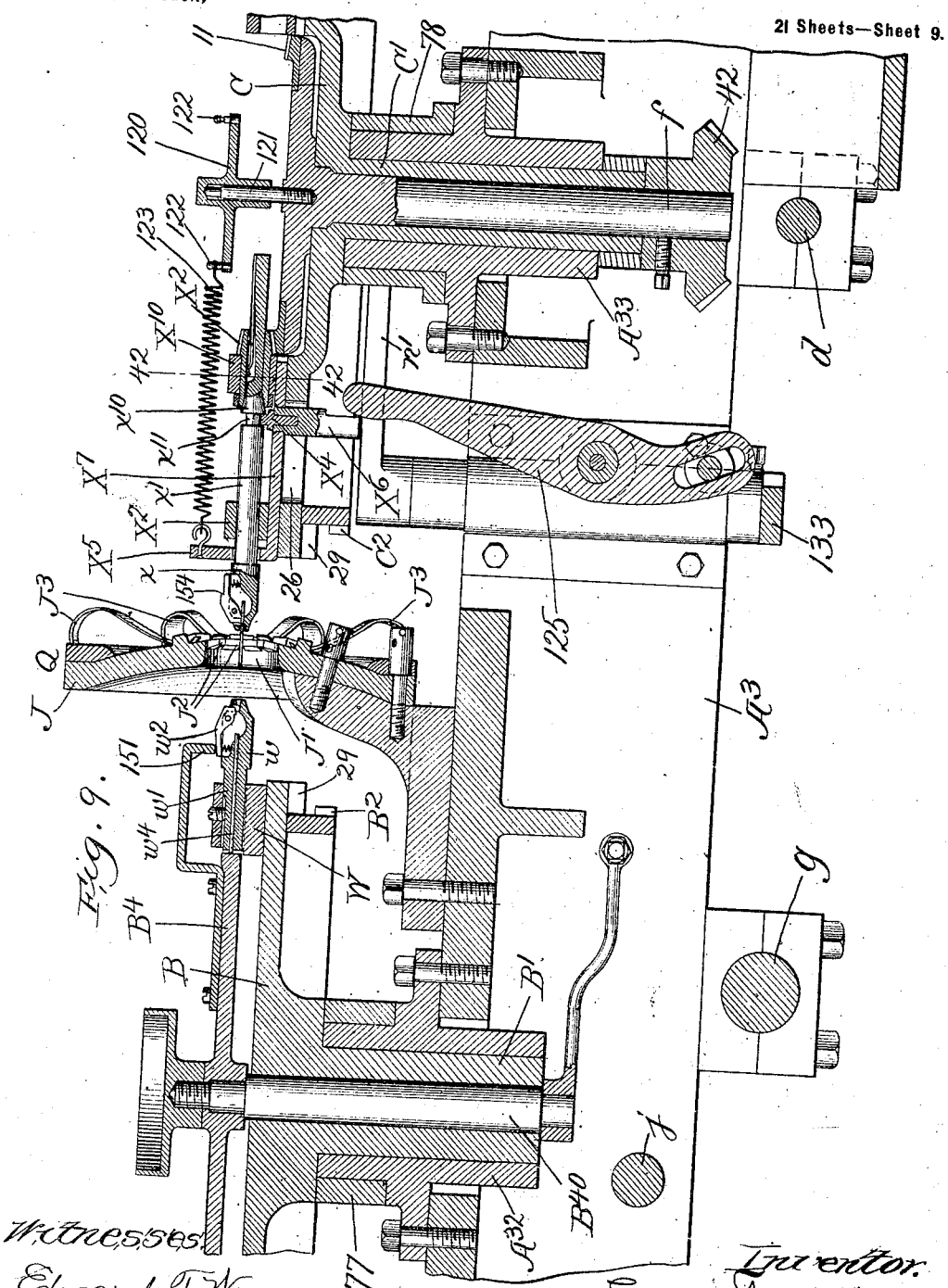

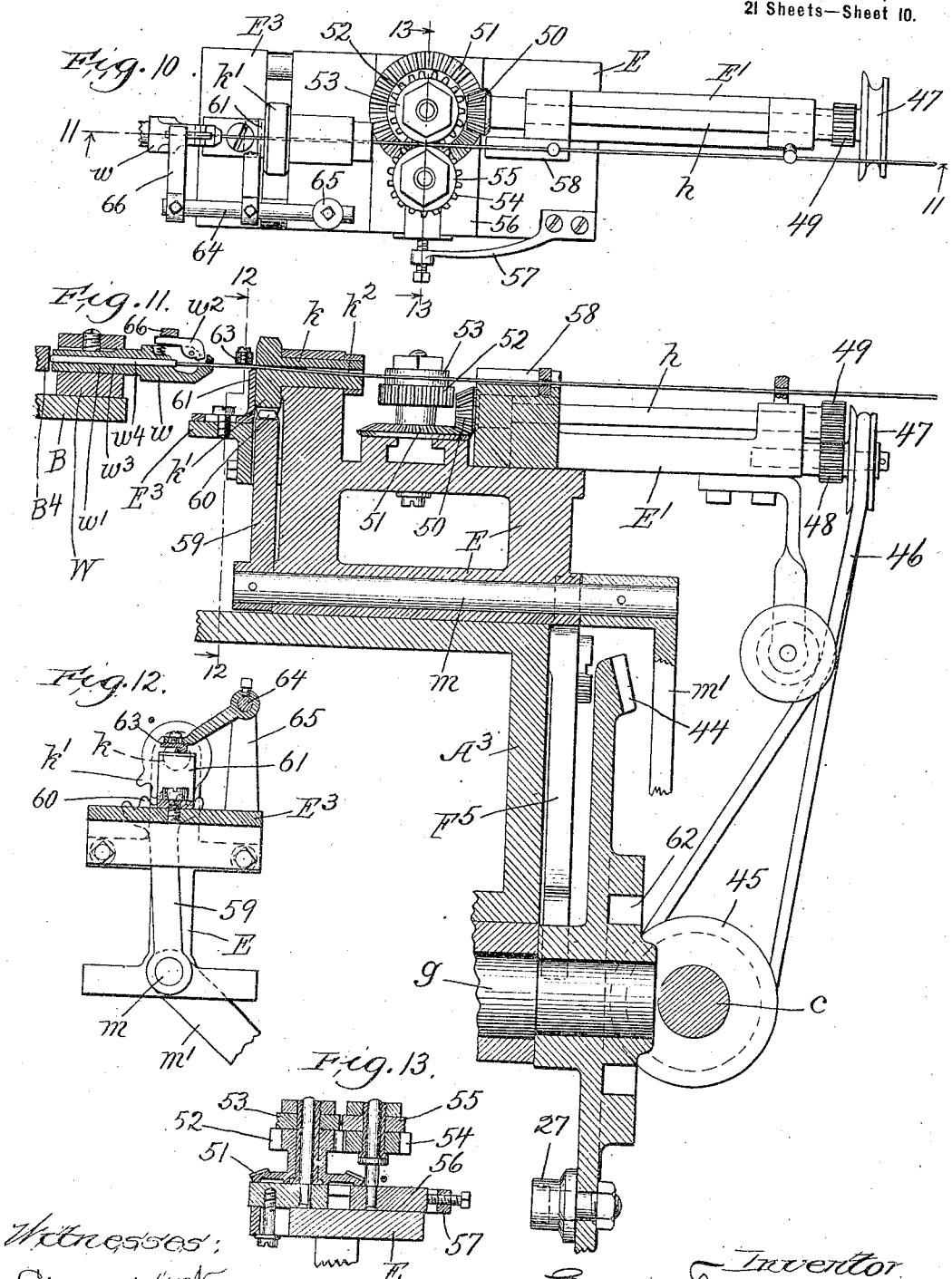

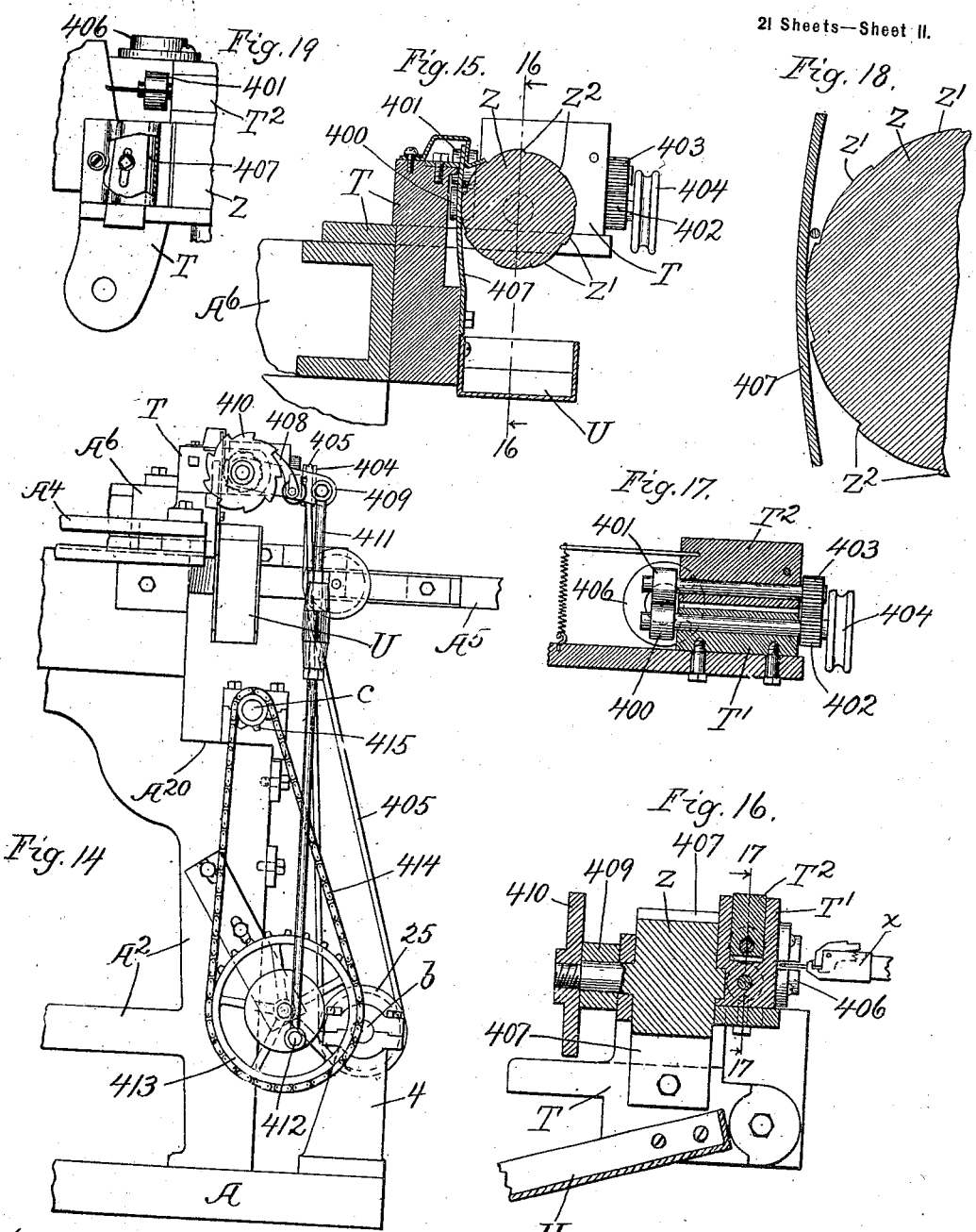

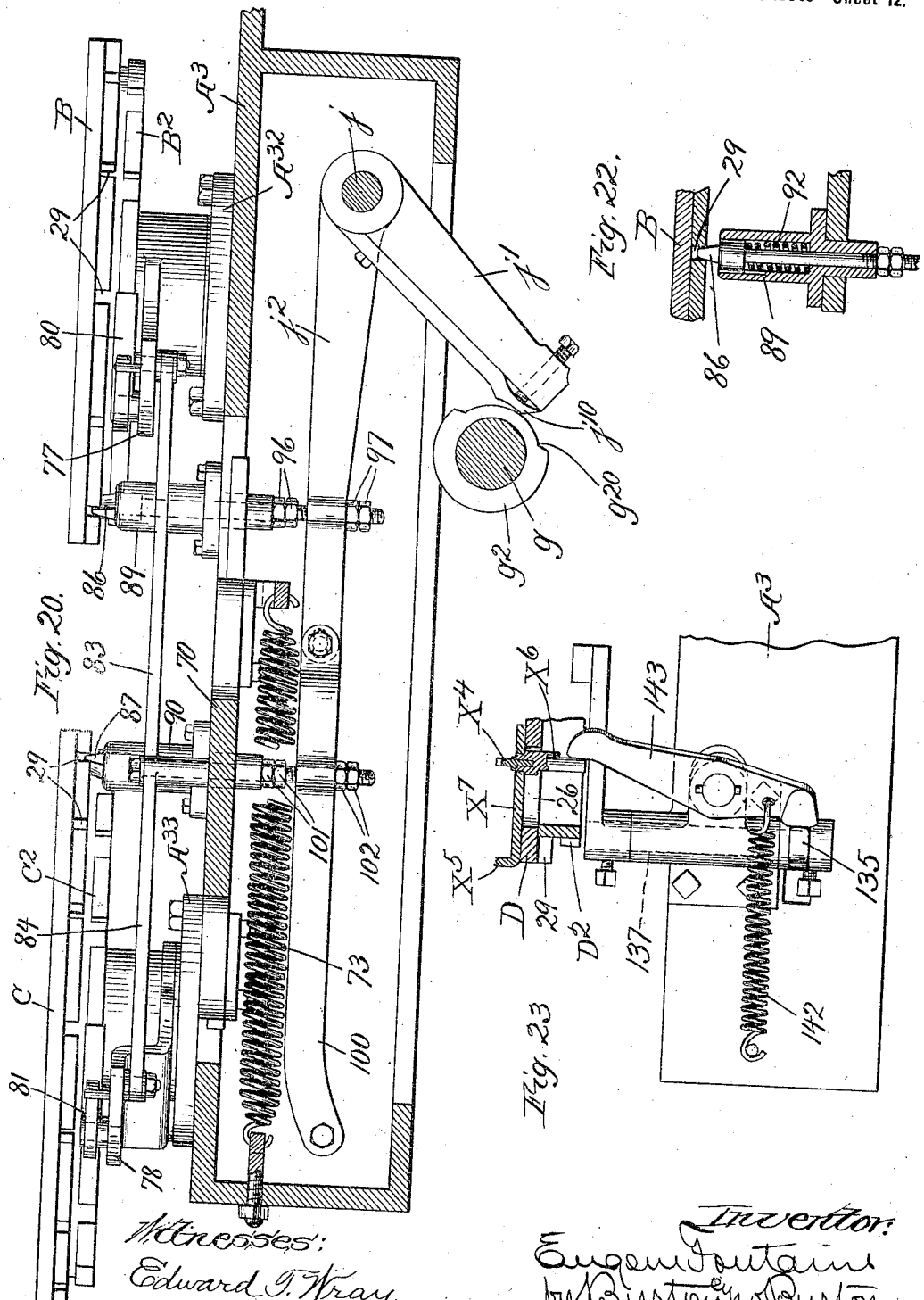

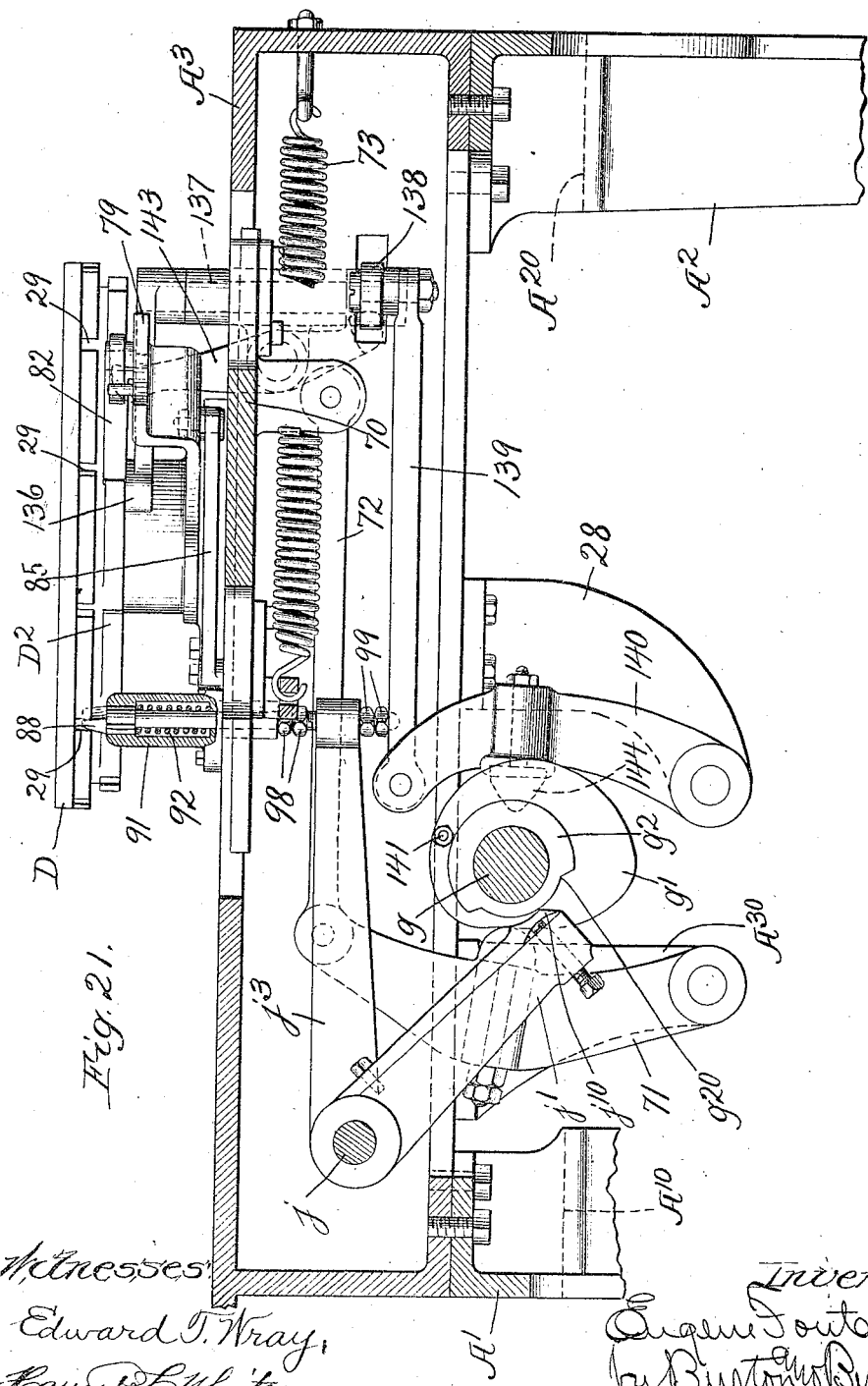

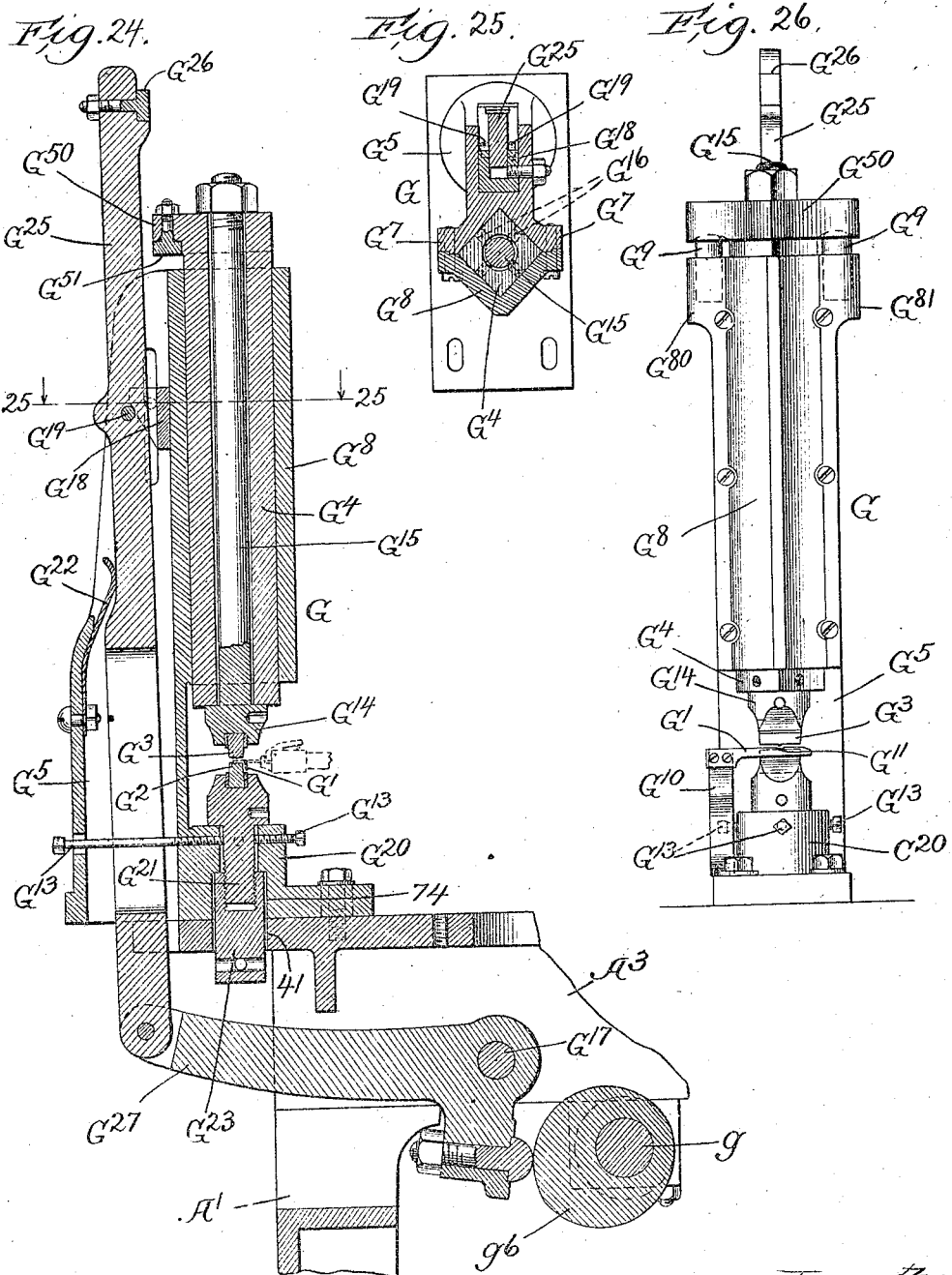

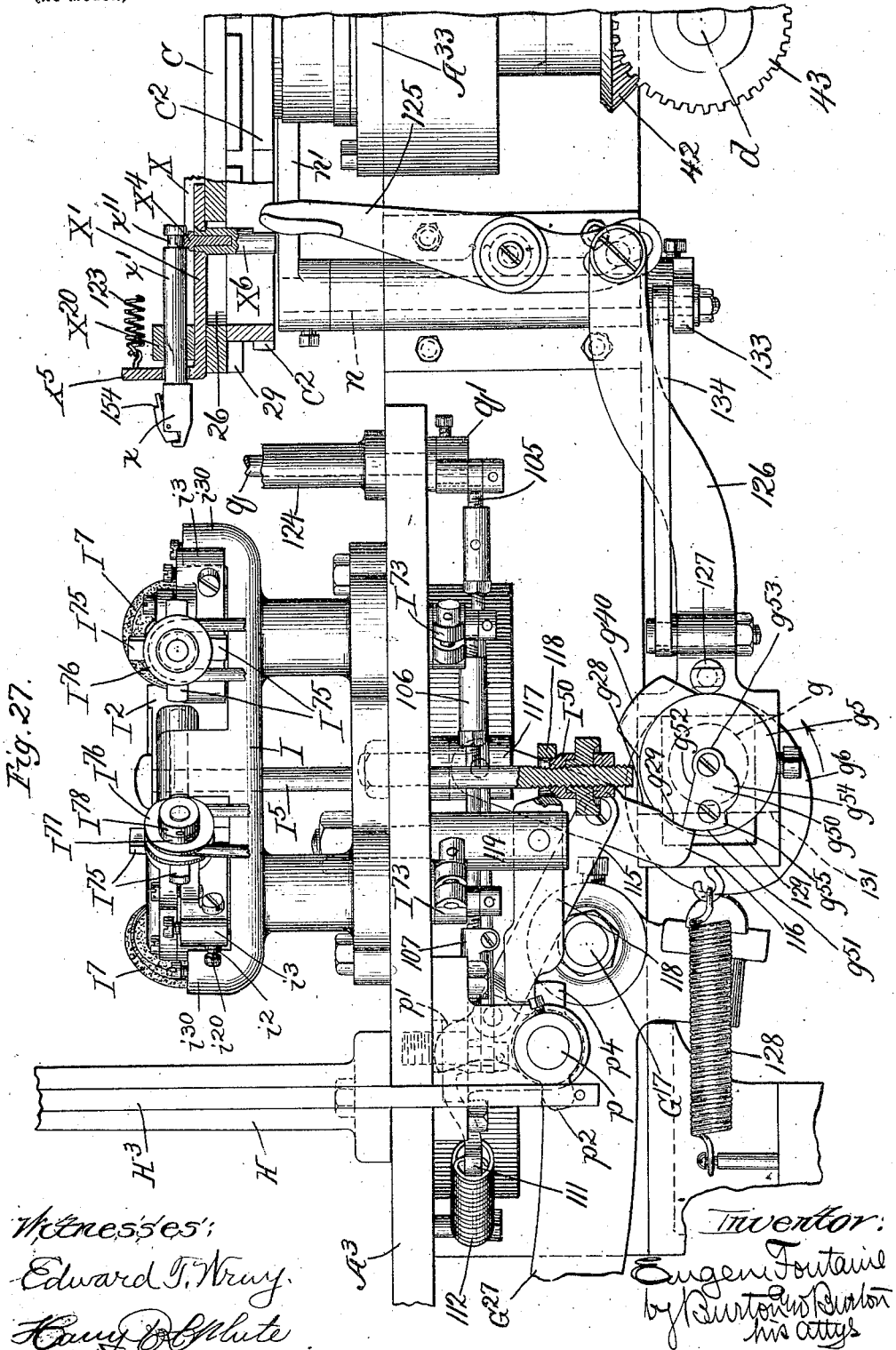

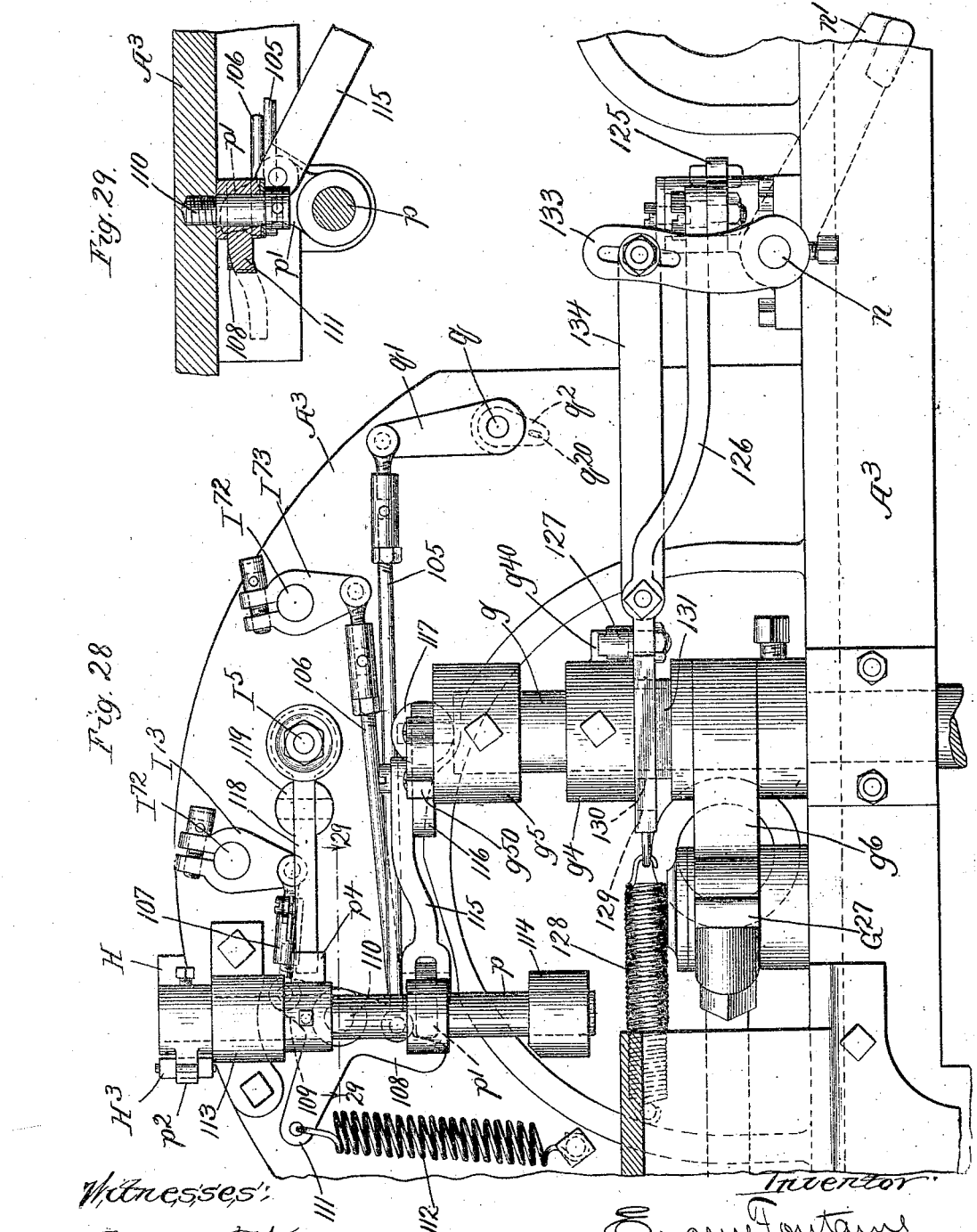

No. 712,054. Patented Oct. 28, 1902.
E. FONTAINE.
NEEDLE MAKING MACHINE.
(Application filed Jan. 23, 1899.)
(No Model.) 21 Sheets—Sheet 17.
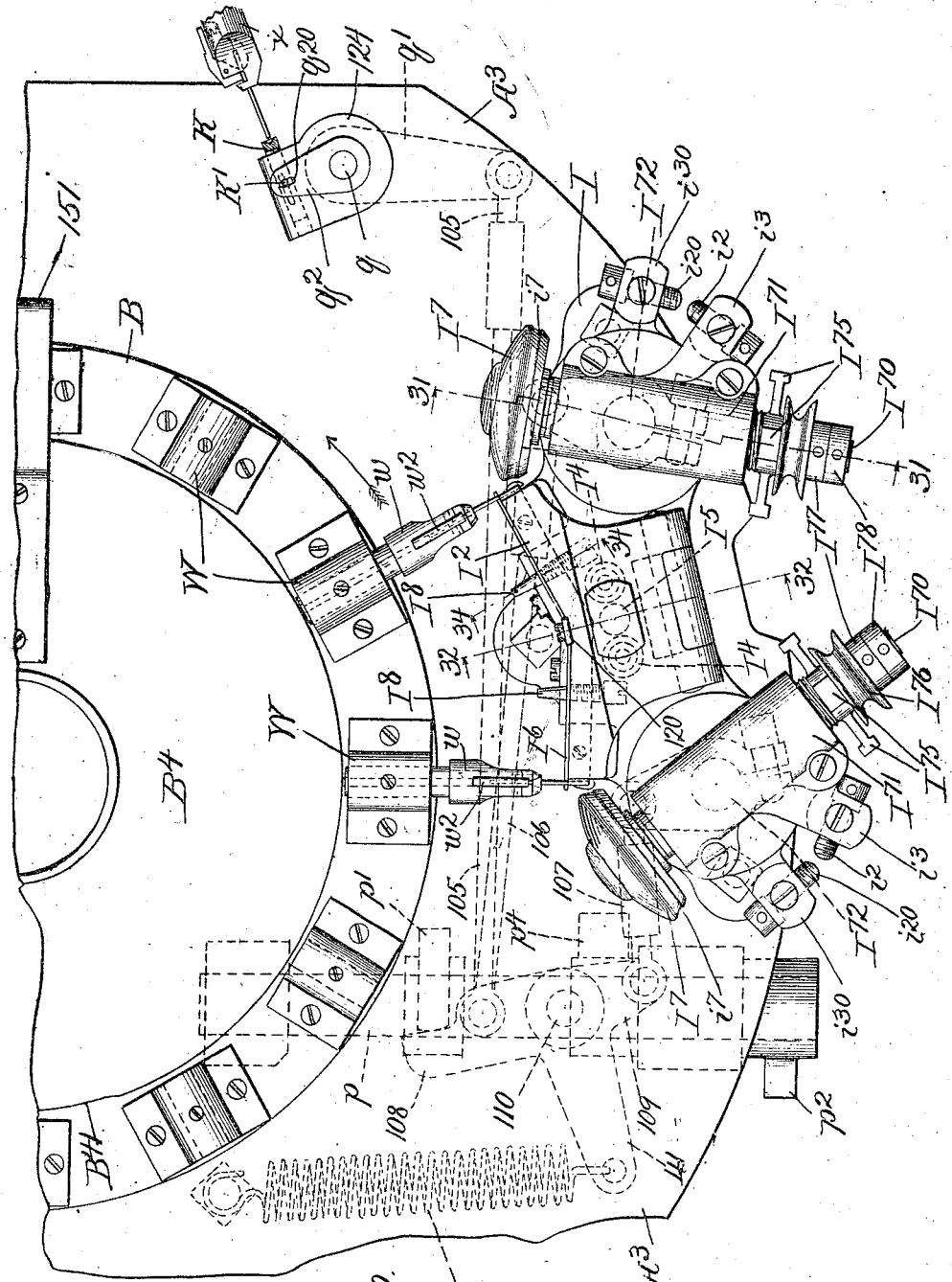
Witnesses:
Edward T. Wray
Harry E. White
Inventor
Eugene Fontaine
by Burton & Burton
his attys

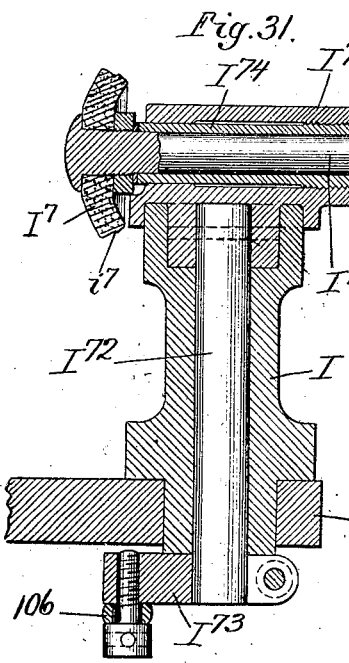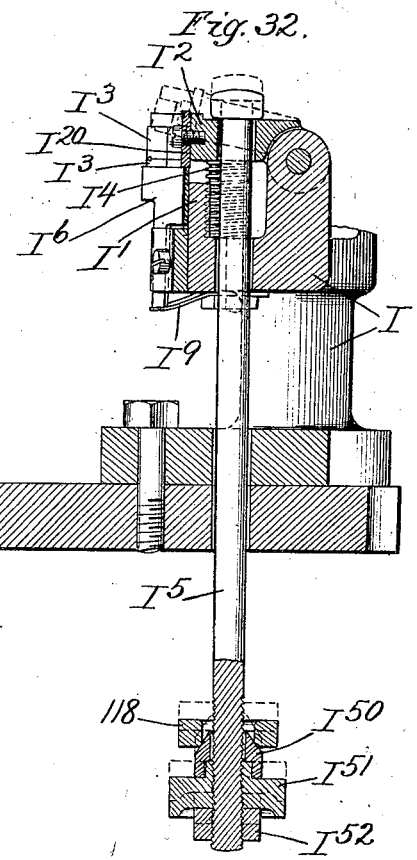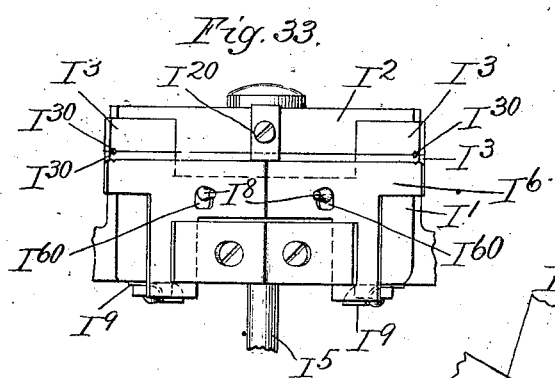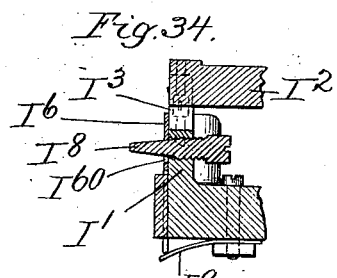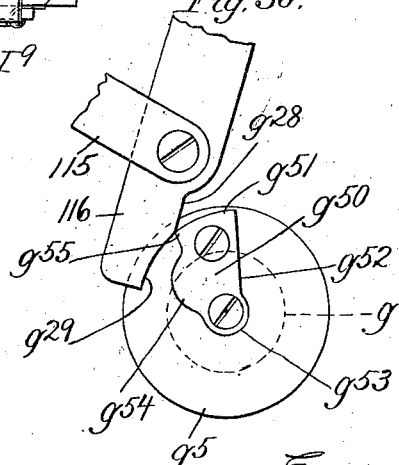

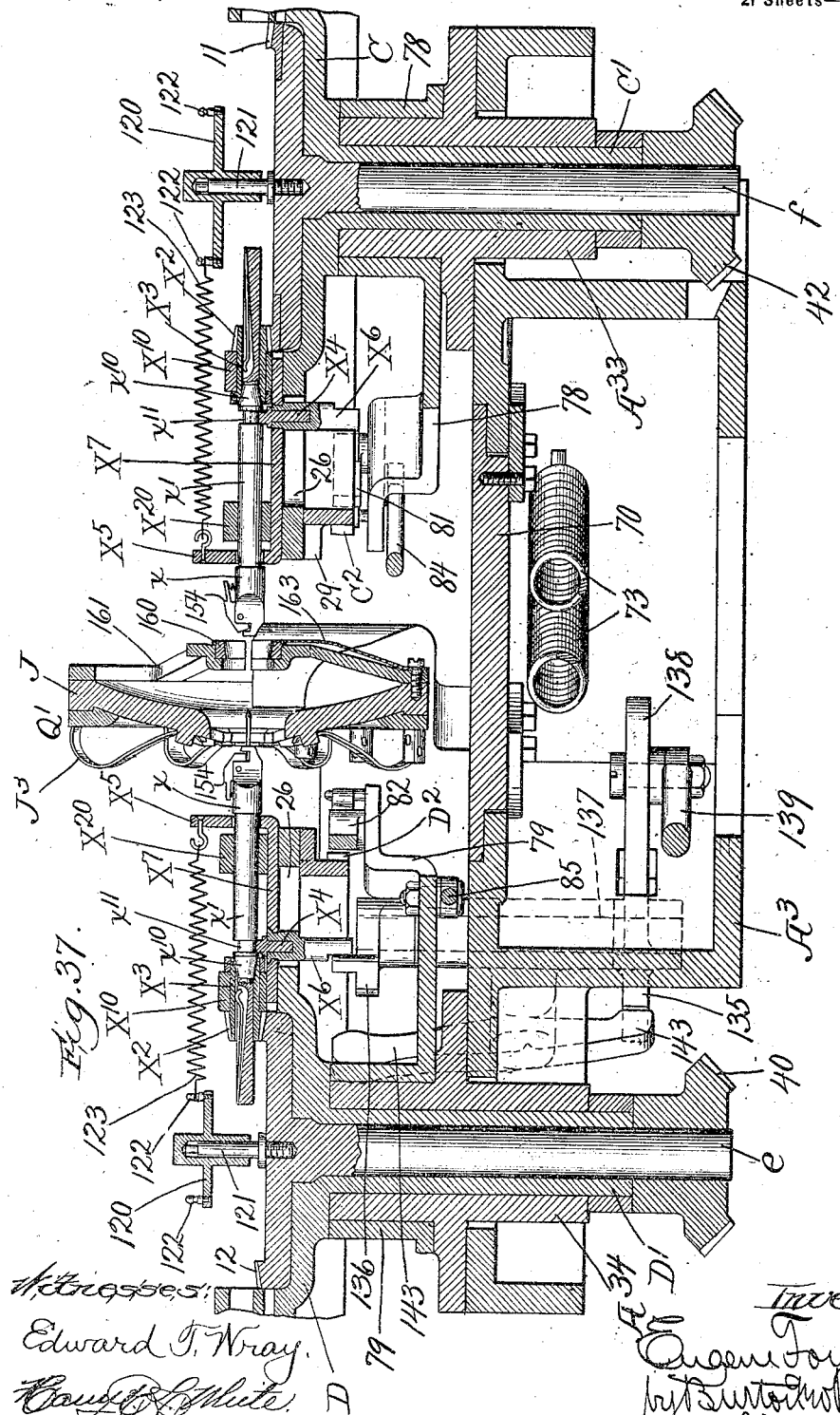

No. 712,054. Patented Oct. 28, 1902.
E. FONTAINE.
NEEDLE MAKING MACHINE.
(Application filed Jan. 23, 1899.)
(No Model.) 21 Sheets—Sheet 20.
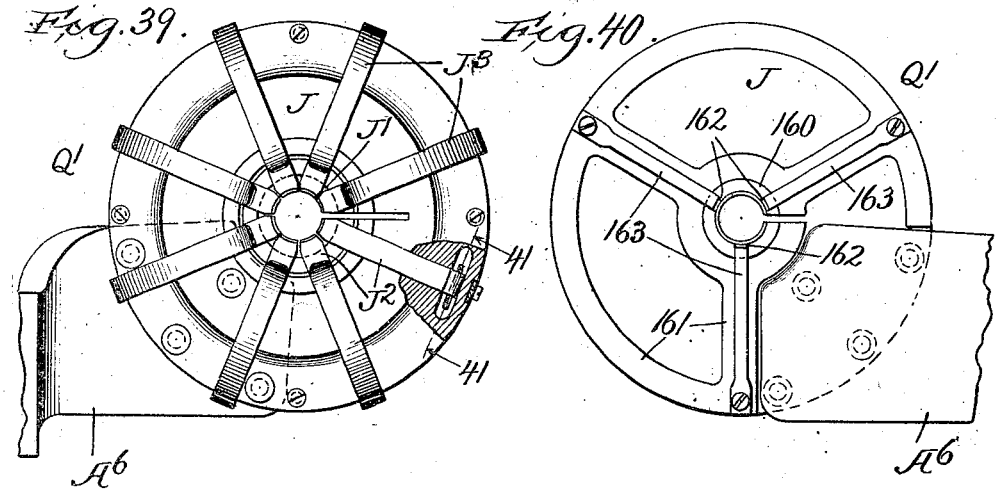
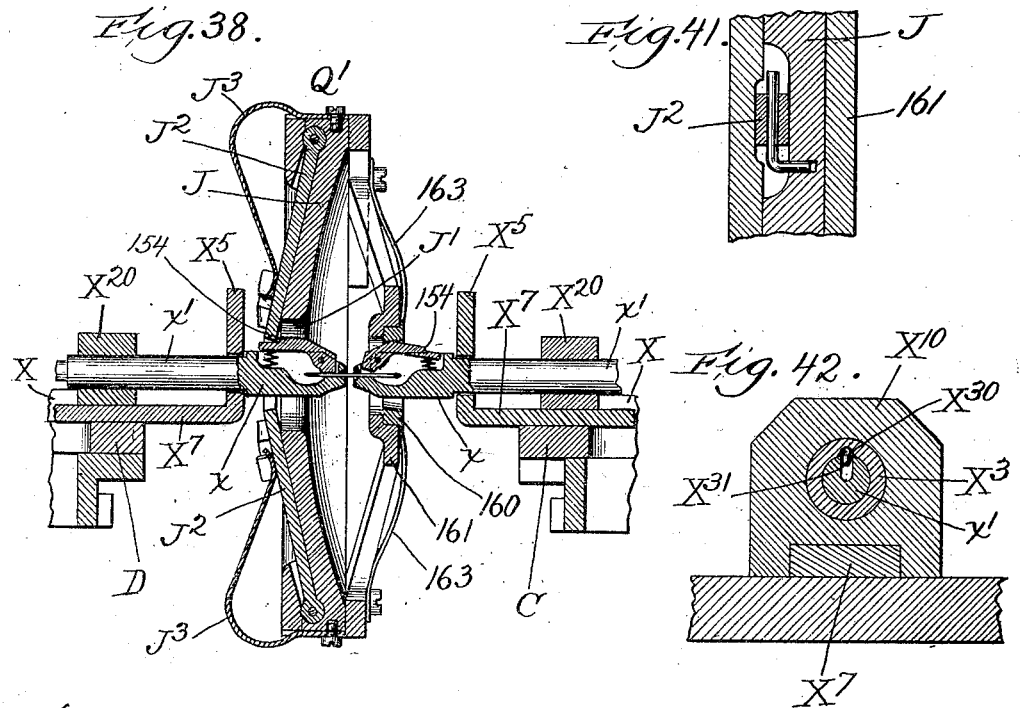

No. 712,054. Patented Oct. 28, 1902.
E. FONTAINE.
NEEDLE MAKING MACHINE.
(Application filed Jan. 23, 1899.)
(No Model.) 21 Sheets—Sheet 21.
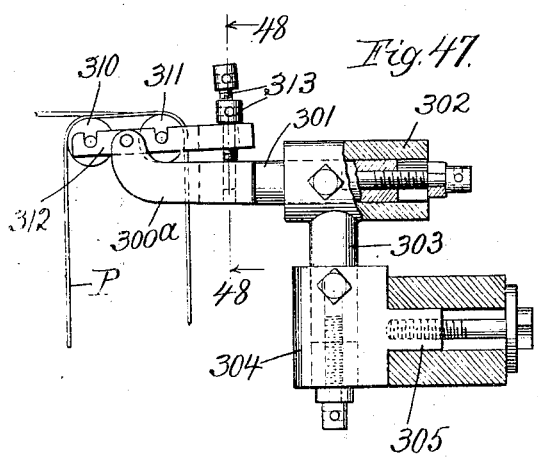
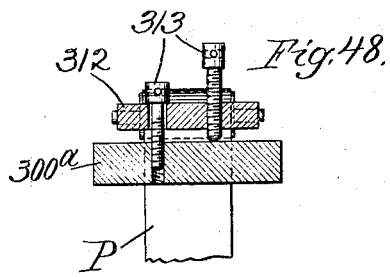
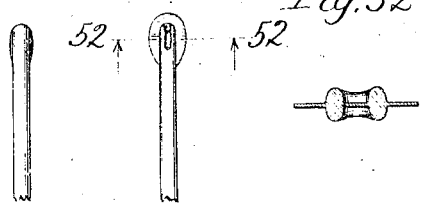
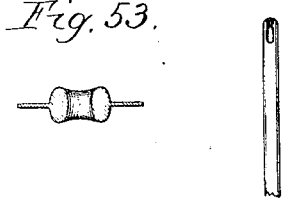
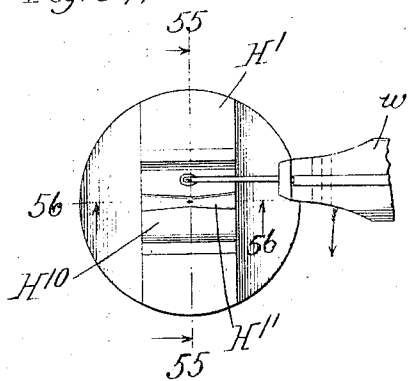
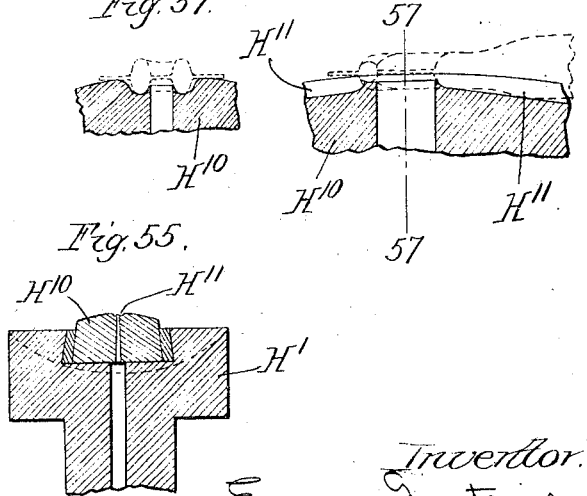
Witnesses:
Edward T. Wray.
Harry B. C. White.
Inventor.
Eugene Fontaine
by Burton and Burton
his attys

UNITED STATES PATENT OFFICE.

EUGENE FONTAINE, OF DETROIT, MICHIGAN.

NEEDLE-MAKING MACHINE.

SPECIFICATION forming part of Letters Patent No. 712,054, dated October 28, 1902.

Application filed January 23, 1899. Serial No. 703,081. (No model.)

*To all whom it may concern:*

Be it known that I, EUGENE FONTAINE, a citizen of the United States, residing at Detroit, county of Wayne, and State of Michigan, have invented certain new and useful Improvements in Needle-Making Machines, which are fully set forth in the following specification, reference being had to the accompanying drawings, forming a part thereof.

Figure 1:
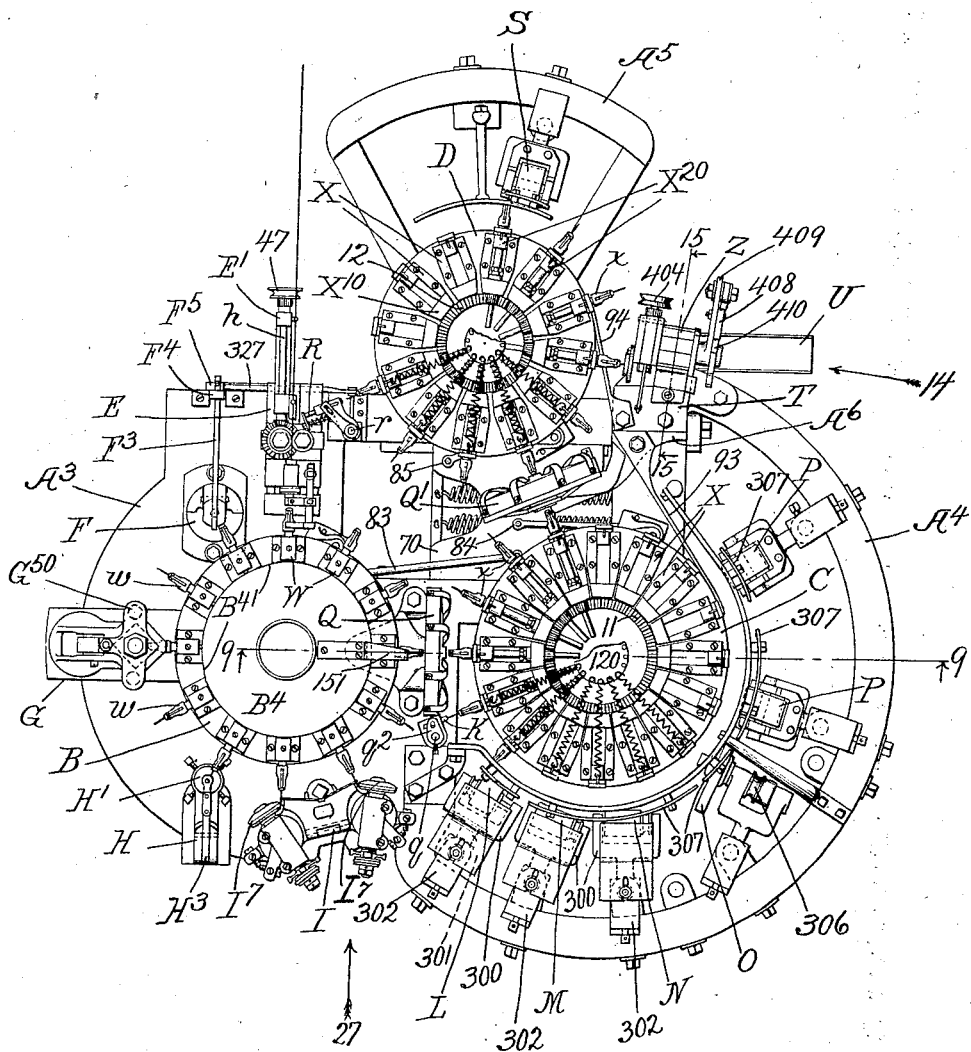
Figure 2:
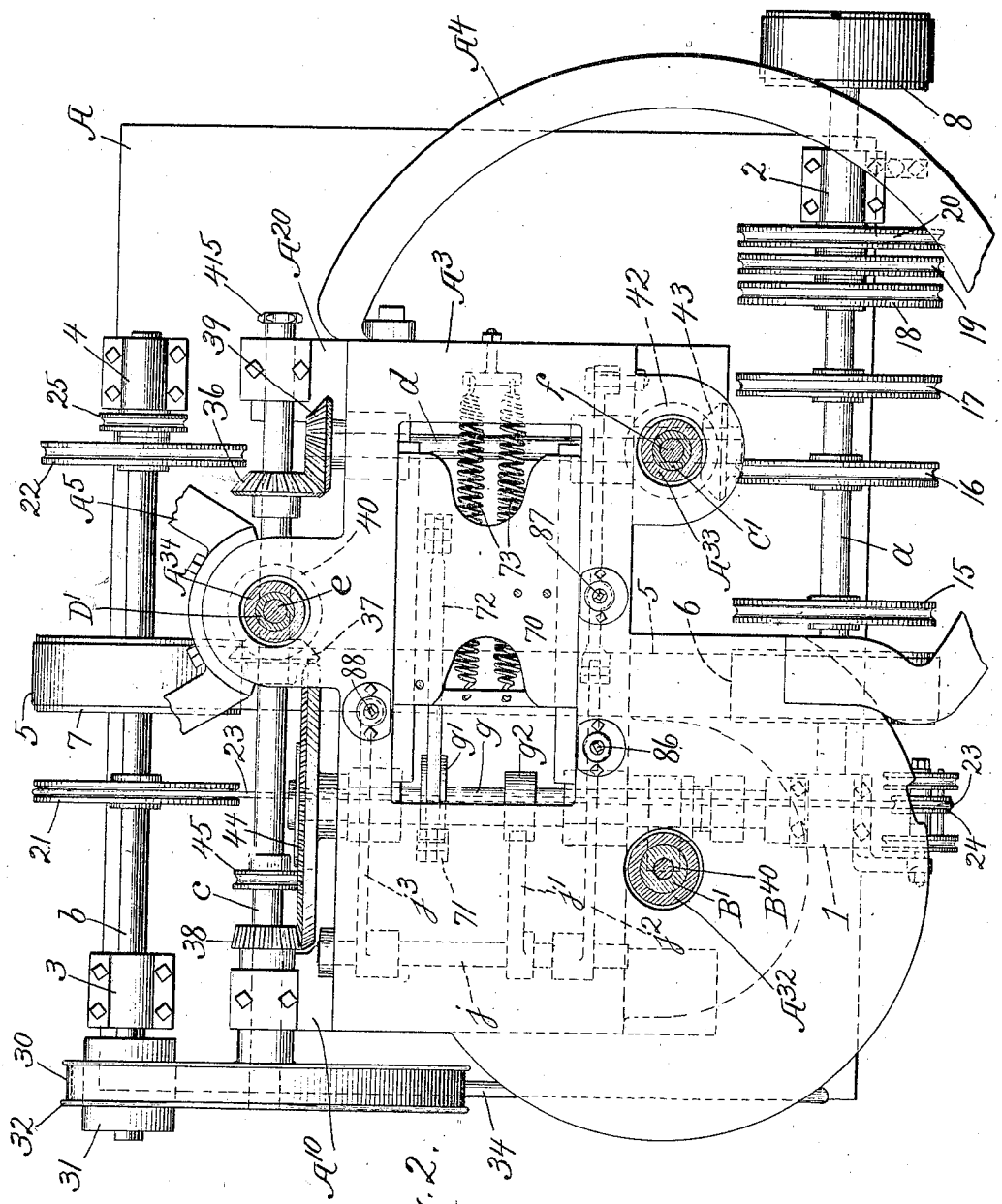

In the drawings, Figure 1 is a general plan of my improved needle-making machine, minor details of structure being omitted or presented only in outline. Fig. 2 is a plan of the general frame and table stripped of the upper mechanism and showing the general organization of the lower part of the machine in respect to the driving-shafts, &c. Fig. 3 is a left-hand side elevation showing only certain parts appearing at that side. Fig. 4 is a partial or detail right-hand side elevation designed chiefly to show the driving connections of certain mechanisms at that side of the machine. Fig. 5 is a rear side elevation, the carriers and much of the detail mechanism being omitted. Fig. 6 is a forward side elevation showing the driving mechanism for the point cutting and dressing devices. Fig. 7 is an inverted plan of the table and mechanism on the under side thereof. Fig. 8 is a detail plan designed to illustrate the carrier-operating mechanism and showing the table and the carriers thereon stripped of chucks and partly broken away to show mechanism underneath. Fig. 9 is a section at the line 9 9 on Fig. 1, extended through the stems or spindles of the first and second carriers. Fig. 10 is a plan of the wire-feeding and cutting-off mechanism. Fig. 11 is a section at the line 11 11 on Fig. 5, on an enlarged scale, the plane of the section in respect to the parts shown on Fig. 10 being also indicated on that figure by the line 11 11. Fig. 12 is a detail section at the line 12 12 on Fig. 11. Fig. 13 is a detail section at the line 13 13 on Fig. 10. Fig. 14 is a detail side elevation looking in the direction of the arrow 14 on Fig. 1, showing the straightening devices and operating mechanism for the same. Fig. 15 is a detail section of the same at the line 15 15 on Fig. 1. Fig. 16 is a section at the line 16 16 on Fig. 15. Fig. 17 is a section at the line 17 17 on Fig. 16. Fig. 18 is a detail section showing the straightening-roll and coöperating shoe or spring, section being at the same plane as Fig. 15, on an enlarged scale. Fig. 19 is a detail plan of the parts shown in Fig. 15, the feeding-rolls and the straightening-roller being partly broken away. Fig. 20 is a section at the line 20 20 on Fig. 7 on an enlarged scale. Fig. 21 is a section at the line 21 21 on Fig. 7 on an enlarged scale. Fig. 22 is a detail section axially through the locking-bolt bearing of one of the carriers, showing the detail construction of the locking device which is similar in respect to all three of the carriers. Fig. 23 is a detail elevation of the device for thrusting out the chucks on the last carrier toward the delivery-rolls looking in the direction of the arrow 23 on Fig. 8, section being made radially with respect to the carrier through the tripping-finger. Fig. 24 is a vertical section of the press for impressing the eye and head, made at the line 24 24 on Fig. 3. Fig. 25 is a section at the line 25 25 on Fig. 24. Fig. 26 is an inner or forward side elevation of the press shown in Fig. 24. Fig. 27 is a detail elevation, partly sectional, looking in the direction of the arrow 27 on Fig. 1, section being made at the vertical plane of the axis of a chuck on the second carrier. Fig. 28 is an inverted plan of a portion of the operating mechanism pertaining to the parts shown in Fig. 27. Fig. 29 is a detail section at the line 29 29 on Fig. 28. Fig. 30 is a direct or top plan of the mechanism for exteriorly forming the head end of the needle, removing the burs, &c. Fig. 31 is a detail section at the line 31 31 on Fig. 30. Fig. 32 is a detail section at the line 32 32 on Fig. 30. Fig. 33 is a detail inner face elevation of the gripping-jaws for holding the blank during the lateral formation of the head. Fig. 34 is a detail section at the line 34 34 on Fig. 30. Fig. 35 is a magnified detail section through the gripping-jaws shown in Figs. 31 to 33, inclusive, transversely with respect to the needle-blank gripped therein preparatory to lateral dressing. Fig. 36 is a detail elevation of a cam for producing the movement of the mechanism shown in Fig. 30. Fig. 37 is a vertical section through the axes of the second and third carriers, section being extended to include the center bearings and operating-gears of both carriers. Fig. 38 is a detail section axial with respect to the chucks on the second and third tables at the instant of transferring the blank from one to the other, showing the transferring devices. Fig. 39 is a side elevation of the transferring device looking from the center of the receiving-carrier. Fig. 40 is an elevation of the transferring device shown in Fig. 38, looking at the side toward the delivering-carrier. Fig. 41 is a detail section at the line 41 41 on Fig. 39. Fig. 42 is an enlarged section of the stem and bearing of one of the chucks on the second and third tables, as at the plane of the line 42 42 on Fig. 9. Fig. 43 is a detail section at the line 43 43 on Fig. 3. Fig. 44 is a detail elevation looking in the direction of the arrow 44 on Fig. 43. Fig. 45 is a detail plan of a setting device for adjusting the depth of the blank in the chuck on the third carrier. Fig. 46 is a detail elevation of the same looking in the direction of the arrow 46 on Fig. 45. Fig. 47 is a detail elevation, partly broken away, to show certain interior details of construction of the dressing or finishing belt-carriage for operating upon the protruded ends of the blank, either point or head, the same being shown in relation to the point. Fig. 48 is a detail section at the line 48 48 on Fig. 47. Figs. 49, 50, and 51 are detail plans of the head end of the needle in different stages of formation. Fig. 52 is a section at the line 52 52 on Fig. 50 before the eye is pierced through. Fig. 53 is a similar section after the eye is pierced through. (All the views from Fig. 49 to Fig. 53 are upon a magnified scale.) Fig. 54 is a plan of the die on which the needle is pierced through. Fig. 55 is a section at the line 55 55 on Fig. 54. Fig. 56 is a largely-magnified longitudinal section at the line 56 56 on Fig. 54, showing the needle at dotted line in position on the die. Fig. 57 is a section at the line 57 57 on Fig. 56.

I will first describe the general organization of my improved machine.

A is a rigid cast-iron base-block on which all the supporting parts of the framework are mounted in order to insure perfect rigidity.

A' and A² are standards mounted upon the base-block A.

A³ is a top frame or table which is mounted upon and rigidly unites the standards A' and A².

A⁴ is a segmental or arc-shaped extension of arm of the table-top A³, arranged to support certain of the mechanisms which are grouped about and coöperate with one of the rotating carriers.

A⁵ is a lesser or shorter segmental or arc-shaped extension of the table A³, which is designed to support certain other mechanisms which coöperate with another of the rotating carriers.

On the table A³ there are mounted three rotating carriers B, C, and D. The carrier B has a plurality of chucks or gripping devices for holding the needle-blanks arranged radially with respect to the carrier. The carrier C has also a plurality of radially-arranged chucks for carrying the needle-blanks with mechanism for rotating the same, and between these two carriers B and C there is located a device for transferring the needle-blank from a chuck on the first carrier to a chuck on the second carrier when the two chucks are in line. The carrier D is also supplied with a plurality of radially-arranged chucks and means for rotating the same, and between the carriers C and D there is located a device for transferring the blanks from the chucks on one carrier to those on the other.

The wire-feeding and cutting-off mechanism which is mounted upon a bracket or standard E on the table A³ is arranged to direct the blanks when cut off from the running wire radially with respect to the carrier B, so that the chucks on that carrier may successively receive the blanks as the carrier rotates. Grouped around this carrier in position to be reached successively by the blanks which the chucks carry protruding radially are the several mechanisms for forming the head and eye of the needle, as follows, to wit: A press F for flattening the end of the wire preparatory to impressing the same in the form desired. A press G for impressing the blanks to form the outline of the head and the impression of the eye and the thread-channels leading thereto. A press H for piercing the eye. A mechanism mounted on the frame I for dressing off the exterior burs which are left by the impressing-dies in press G.

Next in order following around the carrier B there is found the blank-transfer ring Q, which is located in a plane at right angles to a line connecting the centers of the carriers B and C. The blank when transferred is carried with the end protruding which has not been operated on, but which is to be shaped to form the point.

Arranged about the carrier C on the table A³ and the segment-arm A⁴ are the several mechanisms by which the point of the needle is formed, as follows: K, a gage-finger for limiting accurately the distance which the blank protrudes from the chuck; L, a cutter for performing the first cutting operation upon the point; M and N, cutting or grinding rolls for performing the further steps in the same operation; O, a grinding-disk for further dressing the point; P P, polishing-belts for completing the process of dressing the point.

After the needle passes the belts P P it reaches the transfer-ring Q', located between the carriers C and D in a relation similar to that of the transfer-ring Q, between the carriers B and C. Here it is transferred to a chuck on the carrier D, by which it is carried with the head protruding to a gage R and next to a polishing-belt S, by which the head is finely polished, and finally to a withdrawing and straightening mechanism on the bracket T. This latter mechanism delivers it when straightened into a receptacle or chute U. The chucks on the table B are not individually rotated, and the needle-blanks therefore present the same side up while they are carried in these chucks. The chucks on the carriers C and D, however, are rotated about their axes, respectively, while they carry the needle to and past the various grinding and dressing mechanisms.

With this general survey of the machine and the course of the needle-blanks as they are formed and operated upon by it, the various parts of the mechanism for producing the movements and performing the processes which have been generally mentioned may be understood from the following detailed description.

In order to conveniently communicate power to the mechanisms at both sides of the table, there are provided two parallel shafts $a$ and $b$ at the front and rear, journaled in short standards 1, 2, 3, and 4, which are mounted upon the base-block at the front and rear sides thereof. A belt 5, passing about the pulleys 6 and 7 on the shafts $a$ and $b$, respectively, connects the two shafts operatively. Power may be communicated to operate the machine by means of a belt passing over a pulley on either of these shafts. As illustrated, the pulley 8 on the shaft $a$ is provided for this purpose. On this shaft are pulleys 15, 16, 17, 18, 19, and 20, which by means of suitable belts and driving connections actuate the grinding and polishing devices L M N O P P. On the shaft $b$ are the pulleys 21, 22, and 25. The first by means of a belt 23, extended across under the table to pulley 24, by intervening mechanism, drives the grinders I' I', which are mounted on the frame I for dressing off the exterior burs at the side of the needle-eye. The pulley 22 on the shaft $b$, by means of suitable connections hereinafter described, drives the polishing-belt S, which operates adjacent to the carrier D and polishes the head of the needle, and the pulley 25 by suitable belt operates the delivery-rolls. All grinding, dressing, or polishing mechanisms thus mounted on the table adjacent to the path of the needle-blank as it is carried by the chucks on the several tables, which necessarily for their functions operate at considerably high speed, it will be observed, are continuously driven so long as power is applied to the machine. In distinction from these mechanisms the several mechanisms which have to do with the handling of the blanks and operating upon them otherwise than continuously, including the various press mechanisms which form the head and eye, are driven by a secondary train, which is arranged to be disconnected at will from the continuously-operated train. The initial shaft in this secondary train is the shaft $c$, which is journaled in suitable boxes on the hips $A^{10}$ and $A^{20}$ of the standards $A'$ and $A^2$, respectively, at the rear side of the machine and is driven by a belt 30, which passes about a small pulley 31 on the shaft $b$ and a larger pulley 32 on the shaft $c$, being normally slack on the pulleys and arranged to be brought into driving relation by the slack or take-up pulley 33, suitably mounted on a lever 34, fulcrumed on the frame-standard, and carrying also a brake-shoe 35, which is arranged to come into operative relation to the pulley 32 or the belt thereon when the take-up pulley is withdrawn to slack the belt. On the shaft $c$ there are mounted beveled gears 36, 37, and 38. On the under side of the top frame $A^3$ in the horizontal plane of the shaft $c$ there is journaled the shaft $d$, which at its rear end has a beveled gear 39, equal to and meshing with beveled gear 36, whereby the shaft $d$ receives power and equal motion from the shaft $c$.

At the center of the segment or arc-shaped extension $A^5$ there is journaled vertically within the spindle of the carrier D the shaft $e$, on the lower end of which there is a beveled pinion 40, which meshes with and is driven by the beveled gear 37 on the shaft $c$. At the center of the segment or arc-shaped extension $A^4$ within the spindle of the carrier C there is journaled another vertical shaft $f$, which at the lower end has a beveled gear 42, which meshes with and is driven by a beveled gear 43 on the forward end of the shaft $d$. The two vertical shafts $e$ and $f$ are provided to rotate the radial chucks on the tables D and C, respectively. In the same horizontal planes with the shafts $c$ and $d$ there is a third horizontal shaft $g$, suitably journaled in boxes mounted on the lower side of the table on top frame $A^3$ and extending across under the table from rear to forward side, for sundry purposes hereinafter explained. This shaft $g$ at its rear end carries a large crown gear-wheel 44, which is driven by the beveled pinion 38 on the shaft $c$. On this same shaft $c$ a pulley 45 is mounted in suitable position to drive by means of belt 46 the pulley 47, which is journaled at the rear end of the arm E' of the standard E, and by means of suitable connections, hereinafter described, drives the wire-feeding and cut-off mechanism mounted on said standard E. In suitable position for receiving the needles from the chucks on carrier D after they have passed the polishing devices to which that carrier carries them there is located mechanism for delivering the needle, which is actuated, as above stated, by belt from a pulley 25 on shaft $b$, and immediately adjacent to these mechanisms there is located straightening mechanism actuated by a train which derives its movement from a sprocket 415 on the shaft $c$. These various mechanisms will now be described in detail.

*Step-by-step rotation and locking of carriers.*—The step-by-step rotary motion of the tables B, C, and D is communicated to them from a sliding cross-head 70, which is arranged to reciprocate on the top frame or table A³. This reciprocating movement is communicated to the cross-head by means of the cam $g'$ on the shaft $g$. This cam operates as the shaft rotates upon the lever 71, fulcrumed on the bracket-arm A³⁰, which extends downward from the lower side of the table A³. This lever is connected by a link 72 to the cross-head 70. Two powerful springs 73 73 are connected to the cross-head and to the frame, reacting between the same to retract the cross-head in the direction opposite that in which it is actuated by the cam. The rotating tables or carriers B, C, and D are formed with spindles B', C', and D', respectively, for the purpose of mounting and journaling the carriers in the table or top frame A³, and steel bushings A³², A³³, and A³⁴ are provided, suitably inserted in bosses in the table-top to afford bearings for the spindles of the carriers. The bushings extend upward above the top of the table A³, and outside of them there are mounted the hubs of the levers 77, 78, and 79, which are thus fulcrumed concentrically with the spindles B', C', and D', respectively. The levers 77, 78, and 79 carry feed-pawls 80, 81, and 82, suitably spring-actuated, to engage the teeth of the feed-rims B², C², and D² of the carriers, respectively. Links 83, 84, and 85, pivotally attached to the upper side of the cross-head 70, are connected, respectively, to the levers 77, 78, and 79 and actuate the latter in the direction to cause the feed-pawls to drive the carriers, respectively, upon the movement of the cross-head, which is positively caused by the cam $g'$. In order to lock the carriers at the positions to which they are thus positively driven, not only so as to prevent overfeed from the momentum given to them by the positive movement, but also so as to prevent retraction or reverse action from any cause, I provide the locking-bolts 86, 87, and 88, mounted in the rigid upright sleeves 89, 90, and 91 on the table A³, the bolts being suitably feathered in the sleeves to prevent their rotation and provided each with a spring 92, reacting between suitable stop-shoulders on the bolts and sleeves within the latter, with a tendency to shoot the bolts upward. The bolts at their upper ends protrude from the sleeves under the margins of the carriers B, C, and D, respectively, and said carriers at their margins in the under side have the square-shouldered notches 29, 29, and 29. The protruding ends of the bolts are slightly tapered to adapt them to enter the notches freely, but to bind in them when fully shot. For the purpose of operating these locking-bolts there is provided a rock-shaft $j$, which is journaled in the top frame A³ and has an arm $j'$ projecting past the shaft $g$ into the track of the cam $g²$ on said shaft and having a suitable abutment $j^{10}$, adapted to ride on the cam and fall into the recessed portion $g^{20}$ thereof. This cam, as to its periphery, comprises two concentric arcs and the shoulders which connect them, so that the abutment of the lever riding on them respectively causes the lever and the rock-shaft to stand at rest, except as to the instant at which the abutment drops from the outer concentric track to the inner one and the instant at which it is lifted again to the outer. The shoulder at which the abutment drops to the inner track is sufficiently abrupt to cause the movement to be practically instantaneous at that point, and the other shoulder is as abrupt as is consistent with the function of forcing the levers outward to the outer track. The springs 92 92 92 of the locking-bolts serve to hold the abutment of the lever inward toward the periphery of the cam. The shaft $j$ has two additional lever-arms $j²$ and $j³$. Each of these lever-arms is slotted. The lower ends of the bolts 86 and 88 extend through the slots and are provided with check-nuts 96 and 97 and 98 and 99 above and below the lever-arms, respectively, so that the action of the rock-shaft caused by the cam $g²$ will withdraw the bolts and permit them to be shot upward at the proper time to unlock and lock the carriers B and D. To similarly operate the bolt of the carrier C, there is provided a lever 100, fulcrumed on the frame and pivotally connected to the free end of the lever-arm $j²$, one of said levers being slotted at the pivotal connection to allow for the play which is necessary on account of the separation of the fulcrum of the two levers. The lever 100 is slotted and receives the lower end of the bolt 87, which is provided with check-nuts 101 and 102 above and below the lever, operating in a similar manner to that already described with respect to the other bolts.

I will now describe the mechanism for rotating the chucks which are carried on the carriers or rotating carriers C and D. The structure and all the movements of the chucks on these carriers are identical, and the following description may be applied to either of them. As already described, these carriers are each made with spindles C' D', which extend down through the bearings provided for them in the top frame or table A³. The spindles C' D' of the carriers C and D are axially apertured—that is to say, are tubular or sleeve form—and respectively afford bearings for the shafts or spindles $f$ and $e$ of crown gear-wheels 11 and 12, respectively, for which slight recesses are formed in the upper surfaces of the respective rotating carriers. The beveled gears at the lower end of these shafts $f$ and $e$, respectively, have hubs, which serve not only to stop the shafts longitudinally in their vertical bearings in the spindles or stems of the carriers C and D, but also to stop said carrier-stems vertically—that is, against upward movement in their bearings in the table A³. Radially arranged about the annular margin of each of the carriers C and D outside the crown gear-wheel there are secured to the carrier a plurality of chairs or brackets X. These chairs have each two journal-bearings. In the inner bearing $X^{10}$ there is journaled the sleeve shaft or hub $X^3$ of the beveled gear-pinion $X^2$, which meshes with and is driven by the crown-gear. In the outer bearing $X^{20}$ of the chair the spindle $x'$ of the chuck $x$ is journaled and the spindle extends through and obtains bearing also in the sleeve-hub of the pinion $X^2$. The outer end of the bearing in the sleeve-hub is countersunk to afford a seat for a cone-shoulder $x^{10}$, which is formed on the spindle $x'$ and serves to stop the thrust of the spindle inwardly through the sleeve-hub. In order to afford a driving engagement between the pinion and the chuck, which shall be disconnected by the endwise movement of the latter and which shall be measurably yielding, so that the accidental arrest of the rotation of the chuck shall not cause a rupture or disarrangement of the parts, I form a short groove or notch $X^{30}$ in the inner surface of the sleeve-hub $X^3$ just back of the countersink, and I secure to the spindle a spring-feather $X^{31}$, such feather being conveniently made by a wire secured at one end to the spindle and lodged throughout its length in a groove in the surface of the latter, the wire having a knee or bend, which is adapted to engage the notch $X^{30}$ when the spindle is thrust in and just before the cone-shoulder reaches the countersunk seat. The groove in the spindle is deep enough to permit the wire feather to be depressed until the knee or bend is entirely below the surface, so that the spindle may be thrust back until the cone-shoulder is seated while the pinion is rotating and the chuck at rest, but the spring will react outward and throw the bend or knee into the notch of the sleeve as soon as the rotation of the latter brings the notch to the spring-feather. If, however, the rotation of the chuck is positively prevented or arrested while the pinion and sleeve-hub continue to be driven, the spring-feather will yield and permit the disengagement of the sleeve-hub from the spindle. In order to hold these two parts in driving relation, I provide a shipping-slide $X^7$, having slide-bearing in the lower part of the chair or bracket X. Outwardly from the cone-shoulder the spindle has an annular groove $x^{11}$, which is engaged loosely by forked stud $X^4$, which projects up from the slide, the base of the chair being apertured for that purpose. The slide extends outwardly beyond the end of the chair and has at the outer end the upstanding lug $X^5$, which is apertured to admit the chuck-spindle $X'$ without bearing or friction therein, and to this lug there is connected one end of a long coiled spring 123, the other end of which is hooked onto a pin 122 on a disk 120, which is mounted on a spindle 121, rigid with the crown gear-disk at the center of the same. The tendency of the spring is to hold the chuck retracted into driving engagement with the beveled pinion $X^2$.

The friction of the chuck-spindles in their bearings on the rotating carriers C and D, operating to produce resistance to the driving action of the central crown-gears 11 and 12, unless counteracted would tend to cause these gears to rotate the carriers instead of rotating the spindles on the carriers or to operate partly to rotate the carriers and partly to rotate the spindles on the carriers. Such rotation of the carriers would occur in the reverse direction from that in which they are designed to be rotated by mechanism provided for that purpose and would occur, if at all, in the interval during which the cross-head 70 is being retracted after giving the driving stroke to the pawls which rotate the carriers. During the latter portion of this movement the carriers are positively locked; but it is necessary to unlock them before the advance movement is communicated to the carriers by the pawls, and it is not considered feasible to time the unlocking movement so as to be completed absolutely at the instant at which the advance movement commences, and during any slight interval which may be left after the unlocking before the commencement of the advance movement the carriers would be liable to be rotated backward by the frictional action referred to. To prevent such action, I provide for the carriers C and D strong spring-pawls 93 and 94, respectively, which are rigidly attached to the table at suitable points and engage the notches 29 of the carriers, respectively, in a direction to lock them positively against back action. These pawls may be made to engage the carriers at any convenient point—that is, at any notch except the one occupied by the locking-bolt. The most convenient point for attaching these pawls is found on the bracket $A^6$, which is mounted on the table $A^3$ and affords support to the transfer-ring Q and to the brackets or plates on which the discharge feed-rolls and straightening mechanism are mounted.

In order to thrust out the chucks at the proper point to cause them to receive and deliver the blanks, the shipping-slides $X^7$ have each a finger $X^6$, termed the "shipping-finger," which extends down through a slot 26 in the carrier or rotating table, all such fingers on each of the carriers C and D protruding below the carrier in a circle, so that they are each exposed to the action of the operating devices below the table, which will now be described. Fulcrumed on the frame in suitable position below the rotating table or carrier C there is a lever 125, which extends upward and terminates at a point immediately inward from the path of the fingers $X^6$ on that carrier and at a position at which these fingers successively stand when the chucks to which they pertain are in line with the center of the carrier B, that being the position at which the chucks receive blanks from the chucks on said carrier B. To the lower end of the lever 125 there is pivotally connected a link 126, which extends alongside a cam $g^4$ on the shaft $g$ and which has an abutment 127 in the path of rotation of a suitably eccentric or protruding portion $g^{40}$ of the cam $g^4$. A spring 128, attached to the link 126 and to the frame, tends to hold the abutment 127 inward toward the cam $g^4$, so that it shall be exposed in the track of the projection or eccentric portion $g^{40}$ of the cam as the latter rotates with the shaft. The extent and position of the projection $g^{40}$ is such with respect to the other cams on the shaft as to cause the link to be actuated by the cam and to actuate the lever 125 to cause it to thrust out the chuck, which is actuated by the slide behind whose finger $X^6$ it stands in suitable time with the other movements to accomplish the purpose hereinafter more particularly described of receiving the blanks from the chucks on the carrier B. It is convenient, in view of the position of the several parts, to provide guidance for the link 126 by mounting on the shaft $g$ adjacent to the cam $g^4$ a rectangular block 130, which is loose on the shaft, so that it may be held at rest while the shaft rotates, and providing the link with a rectangular aperture 129, adapted to be guided on the rectangular block, said block having also a flange 131 on the side opposite the cam, so that the link is laterally retained between the cam and said flange while it is longitudinally guided on the block.

While carrier C is halted in order to permit one of its chucks to receive a blank from a chuck on the carrier B, it is also intended to deliver from another chuck a blank to a chuck on carrier D, and in order to cause the thrusting or advance movement of the two chucks, one of which advances to receive and the other to deliver a blank, to be simultaneous and also to simplify the mechanism and utilize as far as possible the same parts to perform above movements there is journaled on the frame a vertical rock-shaft $n$, which at the lower end has a lever-arm 133, connected by a link 134 with the link 126, the two links extending from the point of attachment of the former to the latter in substantially the same general direction, so that they receive substantially the same motion from the cam $g^4$. The link 134 thus communicates a rocking movement to the rock-shaft $n$, and said shaft at this upper end has a lever-arm $n'$, which extends in suitable direction and in suitable form to terminate extending upward immediately behind the path of rotation of a finger $X^6$ and at the point in such path at which the chuck to which such finger pertains stands ready to deliver its blank to the opposed chuck on the next carrier.

For the purpose of performing on the carrier D the function of thrusting forward the chuck at the proper time to receive a blank from a chuck on the carrier C and also thrusting out at the same time another chuck to deliver a needle to the delivering-rolls and straightening mechanism the following-described mechanism is provided: On the bracket-arm 28 of the frame there is fulcrumed a lever 140, which depends in the path of an abutment 141, which projects from the back of the cam $g'$, so that the lever is actuated by the abutment as the shaft $g$ rotates. A link 139 connects the upper end of the lever 140 to a horizontal lever-arm 138 of the vertical rock-shaft 137, which is journaled in the frame and has at the upper end a horizontal lever-arm 136, which extends in proper position to engage the finger $X^6$ in proper time to thrust such finger out radially toward the center of the carrier C. From the lower end of the rock-shaft the lever-arm 135 extends opposite to the lever-arm 138 and stands across and in position to bear against the lower end of a lever 143, which is fulcrumed on the frame and at the upper end stands in position to engage a finger $X^6$ at proper time to thrust out a chuck toward the delivering-rolls. A spring 142, attached to the lower end of the lever 143 and to the frame, operates to retract the upper end of the lever 143 to permit the chuck thrust out to retreat, and this spring operates also to hold the lower end of said lever against the lever-arm 135 and to hold the rock-shaft 137 with its upper arm 136 withdrawn inwardly from the path of the fingers $X^6$ and with its arm 138 in position to hold the lever 140 inward toward the shaft $g$, so that its abutment 144 stands in the path of the abutment 141 on the cam $g$. As the cam rotates, therefore, the entire lever system, commencing with the lever 140, including all the arms of the rock-shaft 137 and the lever 143, is operated, and the two chucks, which are in line, respectively, with the center of the carrier C and with the delivering-rolls, are simultaneously thrust out radially to perform their respective functions. At the pivotal connections of the lever 125 and link 126 of the lever-arm 133 and link 134 and of the link 139 to the lever-arm 138 provision is made for adjustment to regulate the throw of the levers, respectively, which are operated by the several connections, this provision consisting of a slot in the lever-arm and an arrangement of the pivot-bolt, so that it may be adjusted in the slot toward and from the fulcruming of the arm. The construction, it will be noticed, permits independent adjustments of the throw of the two chucks which are thrust out on carrier C, because they must be adjusted accurately to meet independent conditions; but the chuck which is thrust out to the delivery-rolls on carrier D does not require especially accurate adjustment in order to properly deliver the needle to its rolls, and no provision is made for adjusting this throw independently of the throw of the mechanism which thrusts out the chucks on this carrier to receive the blank from the carrier C.

The wire is delivered from a reel mounted in any suitable position to cause the wire to run therefrom in a proper direction to enter the feed device. The pulley 47 has rigid with it a small spur-gear 48, which meshes with and drives an equal spur-gear 49, which is fixed on the rear end of the shaft $h$, journaled on the arm $E'$ of bracket E and having at its forward end a beveled pinion 50, which meshes with the horizontal beveled gear 51. This beveled gear 51 is journaled on the bracket E and has rigid with it a spur-gear 52 and a wire-gripping roll 53. A companion gear and roll 54 and 55, rigidly united, are journaled on a plate 56, which slides in the bracket E and is provided with a spring 57, tending to hold the two companion gears and rolls in operative relation to each other to cause the rolls to grip the wire and the companion gears to intermesh and feed the same. In direct line behind the point of tangency of the feed-rolls there is located a channeled block 58 to guide the wire to the gripping-rolls, and in the same line forward of the gripping-rolls there is journaled in the bracket E a short rock-shaft $k$, which at the forward end has formed integral with it a gear-segment $k'$. At the forward end of the bracket E there is a lever 59, fixed on the forward end of a rock-shaft $m$, which is journaled in the lower plate of the bracket E and extends through the same from front to rear. This lever at the upper end has a gear-segment 60, adapted to mesh with the gear-segment $k'$. Forward of the lever 59 there is mounted on the bracket E an angle-ledge $E^3$, which operates as a guard for the lever 59 and which is designed, further, to afford support for the fixed cutter 61. This cutter is angle-shaped, and the upper edge of its vertical lip is beveled and forms the cutting edge. The shaft $k$ has a longitudinal duct or passage $k^2$ for the wire. This passage commences at the rear end at the center of the shaft, but does not extend axially or centrally throughout, but, on the contrary, diverges from the axial line and emerges at the forward end eccentrically. At one position of rest of the parts the eccentric forward end of the duct $k^2$ is above the horizontal plane of the axis of the shaft, and the upper cutting edge of the cutter 61 is located just below this position of rest of this eccentric end of the duct. To the rear of the rock-shaft $m$ there is made fast a lever-arm $m'$, which extends down over the face of the gear 44 and is provided with an abutment $m^{10}$, which takes into the track of the cam 62, fixed on the face of the gear 44. This cam is adapted to rock the shaft $m$ and in proper time with the other movements to cause the intermeshing gear-segments 60 and $k'$ to coöperate to rock the shaft $k$ in the direction to carry the eccentric forward end of the wire-duct past the cutting edge of the cutter and hold it at rest for a short time with the end of the duct covered by the cutter and then rock it in the opposite direction to carry the end of the duct again above and clear of the cutter. The rock-shaft $k$, it will be seen, is one member of a shear for cutting off the wire, and for that reason will be referred to as the "cut-off" rock-shaft. The grip of the feed-rolls on the wire is designed to be sufficient to feed the wire through the rolls and through the duct, but not sufficient to prevent the rolls slipping readily on the wire when the advance of the latter is obstructed by the cutter closing the end of the duct. The feed-rolls, however, being continuously rotated so long as the secondary train is in action, they immediately thrust the wire forward as soon as the rocking of the shaft $k$ carries the mouth of the duct free from the cutter. The action is timed to cause this to occur at the instant at which the rotating carrier B stands at rest, with one of its chucks in line with the thrust of the wire, and, as hereinafter described, when in this position the chucks are held open and in condition to receive the wire thrust into them. While the table still stands at rest the reverse rocking movement of the shaft $k$ is caused by the cam 62, and the wire is severed by the cutter, leaving the protruding portion detached from the running wire as a blank in the grasp of the chuck. Inasmuch as the jaw of the chuck must be open and provided with a sufficiently wide aperture to insure the end of the wire entering it when it is thrust forward by the feed-rolls, the wire will be lodged loosely in the chuck so long as the latter is at rest, and therefore open. Now the cutting action caused by the downward travel of the mouth of the wire-duct past the fixed cutting edge of the cutter operates with a tendency to throw up the free end of the wire beyond the cutter and with some tendency to spring the wire or bow it upward. To prevent this action, I provide a shoe 63, overhanging the wire between the cutter and the chuck in such close relation to the wire that while it permits the latter to be thrust past it and under it to enter the chuck it will prevent any appreciable springing or bowing of the blank which might otherwise be caused by the cutting action. This shoe 63 is adjustably mounted on a bar 64, which extends from a post 65 on the bracket E. The same bar 64 serves to support the shoe 66, which overhangs the path of the chucks on the carrier B and particularly overhangs the tail of the gripping-jaw of the chuck, which encounters it as the chuck comes to the position of rest, with the effect of opening the jaw and holding it open so long as the chuck stands at rest in this position.

The carrier B has a plurality of chucks $w$ $w$, &c., which are mounted radially with respect to the carrier in the chairs or boxes W, rigidly attached to the carrier around the margin. The chucks have spindles $w'$ and the chairs have seats or sockets for the spindles, in which the latter are adapted to be adjusted radially to give them the proper degree of protrusion. The chucks have a pivoted and spring-actuated jaw $w^2$, whose tail encounters the shoe 66 to open the jaw, as above described, and an axial aperture $w^3$, leading from the mouth and extending entirely through the spindles, and in this axial aperture there is lodged a plunger $w^4$, which serves the purpose of a gage, as hereinafter explained. The plunger is loose—that is, free to move in the spindle—but is stopped at the rear or inner end by the periphery of a disk $B^4$, which is secured by a spindle $B^{40}$, which extends through the spindle of the carrier, thereby giving to the disk a long bearing, insuring its steadiness and accuracy of position with respect to the carrier. The disk $B^4$ is circular except that it is slightly cut back throughout about ninety degrees of its circumference, as seen at $B^{41}$, Figs. 1 and 30. The purpose of this slight reduction in the diameter of the disk throughout a portion of its circumference will be explained as the operation of the several mechanisms around this carrier are described. The wire from the reel being first entered through the guide-channel and between the feed gripping-rolls described and into the wire-duct of the cut-off rock-shaft, as soon as in the progress of that movement the eccentric end of the wire-duct is withdrawn above the edge of the fixed cutter, and being thus thrust forward under the guard-shoe 63 enters the open chuck, which at that stage stands open in line with the thrusting movement of the wire, the carrier B being locked in that position at that instant. The next instant the cut-off rock-shaft receives the reverse rocking movement, which carries the running wire in said shaft down past the edge of the fixed cutter, severing a blank the end of which is already in the chuck. Immediately upon the severance of the blank the rotating carriers are unlocked and the step rotating movement is performed, carrying the chuck away from the position in which it receives the blank and relieving its hinged jaw from the restraint of the shoe 66 and allowing it to close under the action of its spring and grip the blank lodged therein. This occurs at the very commencement of the step in the rotary movement of the carrier, and the blank is thus carried in the rigid grasp of the chuck throughout the remainder of this step movement, which is terminated when the blank reaches a position between the upper and lower dies of the press F. The purpose of this press is merely to slightly flatten the wire at the end which is to be formed into the head and which is to be pierced to form the eye, the slightly-flattened surfaces produced by the stroke of the dies in this press serving to lodge the blank accurately on the die of the next press, where the impression is to be formed upon whose accuracy the perfection of this end of the needle depends and which could not be so accurately formed if the stroke were to take effect upon the round wire, because of the liability to roll the wire in the process, and so produce a distorted form or one which would not be uniform in all the blanks struck. In this press F it is important that the blank, which is so far only a round wire, should be lodged squarely—that is, without lateral distortion or springing—on the lower die, and it is at the same time important that the face of the die should be perfectly flat. If the blank were carried laterally to the die, the top of the die being, as stated, perfectly flat, a very slight downward bend of the blank, which it might in many instances receive in the processes of feeding in and cutting off, would cause it to strike against the side of the die and be bent laterally instead of being carried laterally onto the die. To prevent this sort of accident, I provide a spring guide-shoe 115, which is mounted on the side of the press toward the approaching blank and has a slope which allows the blank to pass onto it readily, even if it be slightly deflected downward. The lower die $F'$ in this press is slightly cut away at the side toward the carrier, and in the slight rabbet which is thus formed the end of the guide-shoe 115 is lodged, standing a little higher than the top of the die and not extending across the radial line in which the needle-blank is to project across the face of the die. The blank carried by the chuck readily slides up on the shoe, being slightly sprung up at the free end by the slope of the shoe, and when it runs off the shoe it springs down onto the die at the instant that the carrier comes to rest at the end of the step movement. The upper die $F^2$ of the press F is adjustably secured in the lever-arm $F^3$, fulcrumed on the press-standard. This lever-arm extends back and downward, overhanging the rear edge of the table $A^3$ and being guided at its rear end in a vertically-slotted bracket $F^4$, which by its remoteness from the press-standard in which the forward end of the lever is guided insures to the lever freedom from the lateral oscillation or play. The stroke is communicated by means of a bell-crank lever $F^5$, which is fulcrumed on the rear side of the table $A^3$, one arm of the lever extending down past the back of the gear-wheel 44 and being in the path of an abutment 27, which projects from the back of said gear-wheel and encounters this arm of the lever as the wheel rotates. The other arm of the lever extends under the rear end of the lever $F^3$ and forces that end of the lever up, carrying the die $F^2$ down at the proper time to give the stroke to the blank. The spring $F^{50}$, connected to the end of the lever $F^3$ and to the lever $F^5$, tends to hold the two levers in contact throughout the movement, notwithstanding only one of the movements is forced or positive. In order to adjust the stroke of this press to produce precisely the degree of flattening desired in any instance and with wire of different density or compressibility, I make the contact of the lever $F^5$ with the lever $F^3$ upon a hardened contact-piece $F^{30}$, which is secured to the lever far enough from the end to adapt it to be sprung slightly by means of an adjusting-screw $F^{31}$, set through the lever $F^{30}$ and impinging against the facing, tending to force it away from the main portion of the lever-arm or allowing it to approach the latter when the screw is retracted. One peculiarity of the action of the dies in this press requires mention. The upper die $F^2$ is rigid with the short arm of the lever which operates it and juts off transversely from it, so that its head or operating-face descends upon the lower die in the arc of a circle, which at the end of the stroke is nearly tangent to the lower die, so that the said operating-face approaches the lower die with a drawing movement upon the blank. This prevents any tendency of the stroke to burst or split the wire. The blank next passes to the press G. In this press the most important of the processes required in the formation of the head end of the needle is performed, and in order that the needle should be marketable and serviceable it is essential that the blank be presented to these dies in perfectly accurate position, so that the impression shall be central with respect to diameter of the needle. In order to insure this result as far as far possible, I provide a spring guide-bar $G'$, which extends along past the forward or inner edge to the die $G^2$, being supported by a spring-bracket $G^{10}$, which is secured to the base of the press-standard at a sufficient distance to afford a delicately elastic reaction to the guide-bar. The upper edge of the guide-bar at the end at which the blank approaches the die slopes downward slightly, so that the blank is certain to enter in above it and be guided by it as it approaches the position for the stroke of the die. Just at the position at which the needle stands when it is acted upon by the dies the bar $G'$ has a slight V-shaped notch $G^{11}$, with its sides converging at a suitable angle, so that the blank, which is slightly sprung upward by the edge of the guide-bar as the blank is carried laterally over it, tending to react downward when it reaches the notch, shall be drawn by the slope into the apex of the notch, and shall thus reach the exact position at which it should stand notwithstanding any slight deflection which it may have suffered in the preceding steps. The form of the dies $G^2$ and $G^3$ in this press G may be clearly understood from Figs. 50 and 52, which show the form which they give to the blank, and when the needle leaves them it has its head exteriorly shaped substantially as desired in the finished needle and has formed in it by impressions from both sides the channels leading to the eye and depressions corresponding to the eye to be subsequently formed, the eye itself, however, being still occupied by a very thin portion of metal called the "break," which it is the purpose of the next press to punch out. By forming the eye in this manner—that is, by first impressing it as described and leaving only a small amount of metal to be severed in the final piercing action—the sides of the eye are rendered smooth except as to this very thin break, and the punch which finally pierces the center can be caused to remove this break without leaving a ragged edge, which could not be done if the operation were performed by the pressing or drilling the eye in the first instance. The retention of the break keeping the metal continuous while the impression is formed, which shapes the head and eye and groove, very greatly diminishes the liability to split the wire in this process. The flattening of the blank by the action of the presses F and G tends to slightly lengthen it, and in order to provide for this and to prevent the blank from becoming bent by the lengthening to which it is thus subjected I cut back the disk $B^4$ at the periphery opposite these presses. It is necessary, however, to have the plunger $w^4$ in the chucks positively stopped at the point where the chuck delivers the blank to a chuck on carrier C, unless after the grip upon the jaw is loosened the receiving-chuck should push the blank back instead of receiving it fully, and in practice the disk $B^4$ is brought out with full diameter again before reaching the transferring, and the plunger $w^4$ riding out on the periphery of said disk thrusts the blank forward in the chuck to whatever extent it has been crowded back in the flattening process and holds it thus while the chuck from the carrier C advances to take it. The plunger $w^4$ is preferably employed, as described, because it affords the most convenient means of adapting the chucks to needles of different lengths, which is accomplished by substituting shorter or longer plungers throughout all the spindles. Notwithstanding the metal which is subjected to the action of this press is slight in extent and thickness, nevertheless necessity for almost absolute accuracy makes it necessary to provide a relatively heavy press-standard and also to perform the operation in the manner least calculated to spring the press. These purposes are served in the construction of this press, which is arranged to operate substantially as a drop-hammer, the head $G^4$ being sufficiently heavy and being given a sufficiently long stroke or fall to perform the work required. The standard of the press is tubular, as seen at $G^5$, the tubular portion merging in a flange-base suitable for mounting it on the table and having a suitable die-holding head or block $G^{20}$ extended forward from the tubular portions $G^5$ of the standard at the lower end, while at the upper end it is formed with a long face $G^7$, which is matched with a correspondingly-faced cap $G^8$, their parting being at the diagonal plane of a square guide-bearing for the square shaft of the drop-hammer above mentioned. The drop-hammer is provided at the upper end with a cross-head $G^{50}$, which overhangs suitable lateral lugs $G^{80}$ $G^{81}$ on the upper end of the standard, and in said lugs there are mounted stop-cushions $G^9$ $G^9$, by which the drop-hammer is arrested in its fall and which receive and cushion the blow, the upper die being so mounted in the hammer to strike the blank which may be lodged upon the lower die only by the compression of the cushions, whose reaction immediately lifts it from the blank, which has thus received the necessary blow. Any customary means may be provided for mounting, adjusting, and securing the dies in the drop-hammer and in the bed or die-blocks, respectively. I have shown the lower die-holder $G^{20}$ provided with a spindle $G^{21}$, which extends through the die-block, the aperture in the latter being larger than the spindle to allow range for lateral adjustment in all directions. The lower end of the spindle is threaded and provided with a binding-nut $G^{23}$ below the block to assist in securing it, the table being apertured at 41 and the under side of the die-block recessed at 74 to admit such nut. Four adjusting and set screws $G^{13}$, set through the block $G^{20}$, being arranged to impinge against the spindle, serve to adjust the die-holder laterally and to secure it. In the same manner the upper die-holder $G^{14}$ has a long spindle or stem $G^{15}$, which extends up through the entire length of the drop-hammer. The longitudinal aperture in the hammer through which the spindle extends is slightly larger than the spindle, and at the lower end of the hammer there are set into the four faces thereof adjusting and set screws $G^{16}$, which impinge against the spindle and serve to adjust it laterally and secure it within the range permitted by the size of the aperture. By loosening the binding-nuts at the ends of the spindles of the upper and lower die-holders $G^{14}$ and $G^{20}$ and at the same time slackening the grip of the lateral clamping-bolts the dies may be independently adjusted angularly—that is, by rotation about their axes—as well as to the slight extent laterally which may be necessary. The drop-hammer is operated by means of a lifting-rod $G^{25}$, which extends through the tubular standard and at the upper end is provided with a shoulder $G^{26}$, arranged to engage under the outwardly-projecting abutment $G^{51}$ of the cross-head $G^{50}$ when the bar is thrust upward. The lower end of said lifting-bar is pivotally attached to the longer arm of a bell-crank lever $G^{25}$, which is fulcrumed on the frame at $G^{17}$, the shorter arm being exposed to the action of an eccentric-cam $g^6$ on the shaft $g$, which actuates the lever once in each revolution of the shaft to lift the hammer at proper time to cause it to drop when the needle-blank is properly lodged above the lower die. The lifting-bar is tripped from under the hammer, so as to permit the latter to fall, by means of a cam $G^{18}$, secured in the standard and slotted and extending in two wings at opposite sides of the lifting-bar, so that it stands in the path of the oppositely-projecting abutments $G^{19}$ $G^{19}$, formed by a stud set through the bar. These abutments encounter the cam in the upward thrust movement of the bar and riding thereon cause the bar to be swung outward at the upper end and disengaged from the abutment $G^{51}$ of the cross-head $G^{50}$, thus permitting the hammer to fall. A spring $G^{22}$, secured to the standard, presses against the lifting-bar, tending to hold it inward, so as to engage at its upper end under the abutment $G^{51}$, and such engagement is effected as the lifting-bar is drawn downward after the hammer has fallen by the under slope of the shoulder $G^{26}$, the spring permitting the bar to recede as the shoulder passes the abutment in the descent of the bar and throwing it back into engagement under the abutment.

After the needle leaves the press G the next process to be performed upon it is to pierce the eye, cutting out the thin remnant of metal termed "break" left by the dies after they have impressed the outline of the eye. For this purpose the press H is provided, mounted at a distance of two steps of the carrier's rotary movement from the press G. The die-holder H' in this press is secured and made adjustable in the same manner as the die-holder in the press G. The punch $H^2$ for piercing the eye is carried in the overhanging arm of the reciprocating head $H^3$, which extends down through the standard and past the edge of the table, being exposed to the upward pressure of a spring 75, fastened to the table and bearing against the lower end of the reciprocating head. This reciprocating head is engaged at the lower end by the short lever-arm $p^2$, made rigid with the small rock-shaft $p$, so that the rock of the shaft reciprocates the head. This shaft $p$ is also concerned in the operation of the bur-dressing devices next to be described, and the means of actuating it will be described in that connection. The die $H^{10}$ in the press H is made slightly crowning—that is, sloping up slightly on all sides to the aperture—so that the needle-blank is readily carried onto it, and in the direction of the length of the blank the die has the distinct notch $H^{11}$, whose sloping sides tend to lodge the needle-blank accurately in the recess or impression which is formed about the aperture and shaped to receive and seat the head of the blank which has been shaped by the impressing-dies through which it has just passed. This insures the formation of the aperture or eye with proper accuracy with respect to the thread-grooves, and the die is formed on its upper face to fit the thread-grooves, as is necessary, in order that the metal of the needle-blank may be supported throughout the entire margin of the eye while the latter is being pierced, since otherwise the piercing stroke would have a tendency to break down the metal around the margin whenever it lacked support. In order that, in the first place, the needle-blank shall be held closely and firmly onto the die while the punch strikes and pierces it and that, in the second place, the punch may be prevented from dragging the blank up with it as it withdraws, I provide a presser-foot or stripper $H^4$, overhanging the die and apertured for the punch and having a stem or shank $H^{40}$, which extends up through the overhanging arm of the head H³, and having connected with it by a cross-bar above the head a parallel guide-arm H⁴¹, which also extends through the overhanging arm of the reciprocating head H⁹ and insures the steadiness of the presser-foot in the vertical reciprocating movement which it has with respect to the head. A spring H⁴² is interposed between the overhanging arm and the stop-collar H⁴³ on the stem or shank of the presser-foot and operates to resist the upward movement of the presser-foot and to force it downward. A stop-collar H⁴⁴ on the stem or shank above the overhanging arm limits the downward movement which the spring tends to cause. This presser-foot and stripper is designed to be adjusted by setting the stop-collars so that at the limit of its downward movement it overhangs the die at ample distance above the same to admit the needle-blank, but lower than the point of the punch when the latter is at its highest position, fully withdrawn. As the head descends it carries down both the punch and the presser-foot, the latter, however, reaching the die first and pressing the blank firmly thereon before the point of the punch reaches it. The further descent of the presser-foot being thus prevented, the yielding of the presser-spring permits the punch to descend and do its work, and when the head withdraws, withdrawing the punch from the die, the reaction of the spring continues to hold the presser-foot and stripper firmly on the needle-blank and the latter on the die until the punch has withdrawn so far that the overhanging arm reaches the upper stop-collar on the stripper-shank. The punch is at this stage entirely withdrawn from the needle-blank, and as it continues to rise the presser-foot rises also and leaves the needle-blank free to be carried laterally off the die to the next mechanism which is to operate upon it.

The process performed in press G of impressing the head of the needle to form the exterior outline and also to form the thread-grooves and sink the outline of the eye results in the formation of a slight exterior bur or fin on both sides. These burs it is necessary to remove in some manner which shall not destroy or impair the exterior outline which is produced by the impressing-dies. Heretofore I have attempted in certain machines which I have constructed to remove these burs by exposing the needle while revolving it upon its axis in a chuck to the action of suitable grinding devices. This method, however, tends to impair the outline of the needle, because it is necessarily held with some pressure elastically against the grinding device, and being under rotation the flattened faces as well as the burred edges are pressed up against the grinder, and thus the form which the dies have produced on the flattened faces is marred, and if the grinding is continued long enough to remove the largest burs which are formed it is liable to render the needle valueless by reason of injury to the faces. I have in other instances attempted to remove the bur by separate dies adapted to trim it off; but this process is liable to leave still a rough line where the shearing occurs. In my present machine, therefore, I have adopted a different method and mechanism for this purpose, which I will now describe. At suitable position adjacent to the path of the blanks carried by the chucks on carrier B after passing the press in which the eye is pierced there is located the frame or bracket I, rigidly mounted on the table. This bracket on the side toward the carrier is formed so as to constitute a fixed lower jaw I', and it has hinged to it a movable upper jaw I². These jaws are armed at both ends with steel grippers I³ I³ I³ I³, which work in pairs to hold the needle-blank, as hereinafter described. Springs I⁴ I⁴ are interposed between the jaws, tending to hold them apart, and they are bound together with a limited range of play, subject to the action of the springs, by a bolt I⁵, which extends down through the base of the bracket and through the table and is connected below the latter to operating mechanism, hereinafter described, for closing the jaws. The grippers project beyond the ends of the jaws a distance about equal to the diameter of the needle-blank, and in the opposed faces of the grippers at this projecting part there are formed grooves I³⁰ I³⁰, adapted to afford lodgment for the heads of the needle-blanks, but sufficiently shallow to permit the blanks to be gripped firmly between the grippers when the jaws are forced together by the mechanism. These grooves extend entirely across the projecting portion of the grippers and are immediately adjacent to the ends of the latter—that is to say, they are bounded at the side by a feather-edge at the end of the gripper, so that a blank piece of wire of the size of the needle lodged in the grooves and grasped between the grippers would have its end surface exposed flush with the rear edge of the slight projection of the gripper beyond the jaw and its curved side surface exposed flush with the end surface of the grippers. From this formation it results that the needle-blanks, which have been impressed and have had formed on them the exterior burs extending all around the head, and which are to be dressed off, will be gripped so as to leave half the bur—that is, the bur extending half-way around the head end—protruding beyond the flush rear edge and the flush end surface of the gripper. (See Figs. 30 and 35.) The distance between the grooves or blank-seats at the remote ends of the jaws is equal to the distance between the blanks held in any two consecutive chucks on the carrier, so that while a blank in one chuck is grasped in the grippers at one end of the jaws, exposing the half of its bur at one side of the axis beyond that end of the jaws, a similar blank he' in the next chuck is gripped in the gripper at the remote end of the jaws, exposing the opposite half of its bur beyond that end of the jaws. Thus each blank as it passes by the jaws, halting first in position to be gripped by the grippers at one end and next in position to be gripped by those at the other end, exposes successively the burs which may exist on the opposite sides of the head to the action of any devices which may be provided to dress away the burs. The lower fixed jaw is provided with a lip-plate $I^6$, which is designed to guide the needle-blank with certainty into position above the groove in the gripper. This lip-plate is upheld by springs $I^9$ and checked by taper pins $I^8$, threaded back of their taper and screwed through the back of the fixed jaw and extending through slightly-elongated slots $I^{60}$ in the lip-plate. The taper of the pins adapts them to vary the position at which the upward thrust of the lip is checked. The pins have a long taper, as illustrated, to adapt them to effect the fine adjustment which is required. The adjustment of the lip should be such that the upper edge at the point opposite the groove in the fixed gripper should be fully up to the level of the face of that gripper, so that the blank being engaged over the slope leading to that point shall be sprung up sufficiently to ride clear of the edge of the groove and be in position to lodge in the latter when the lip is depressed. By the operation of the mechanism hereinafter to be described the upper jaw is closed upon the lower jaw immediately after the rotating carrier comes to rest, having brought the needle-blank to the position above the groove of gripper. At the middle point—that is, between the two grippers, which are located at opposite ends of the jaws—the upper jaw is provided with an abutment $i^{20}$, which strikes the upper edge of the lip-plate $i^6$ before the jaw is fully closed and depresses the lip-plate, thus letting the needle-blanks which are resting upon its upper edge overhanging the slots in the grippers yield down into said slots, while at the same time the grippers of the upper jaw closing down upon the blanks grasp them and hold them firmly in the grooves with their burs protruding, as already described. For the purpose of dressing off the burs while the blanks are thus gripped I provide rotating cutters or grinders $I^7 I^7$, which are shaped so that in axial section they conform at a certain part of their rotating surface to the outline of a radial section of the head portion of a perfect needle in a plane transverse to the direction in which the eye is pierced—that is, in the plane of the lateral movement of the needle-blank as it is carried by the carrier B. These rotating cutters $I^7 I^7$ are mounted at the forward ends of their respective shafts $I^{70} I^{70}$, which are journaled in horizontal boxes $I^{71}$, provided with vertical spindles or stems $I^{72}$, which extend down through the bracket I and the table $A^3$, and below the latter are provided with rigid lever-arms $I^{73} I^{73}$. Links 106 107 connect these lever-arms, respectively, with the opposite arms 108 109 of a lever which is fulcrumed at 110 on the table and is provided with a third arm 111, to which there is attached a spring 112, whose opposite end is attached to the frame or table and operates upon the lever and causing its arms 108 109 to thrust and draw the links connected to them, respectively, in directions to swing the cutters $I^7 I^7$ outwardly—that is, away from the ends of the jaws of the frame I. This outward swinging movement of the two cutters is stopped by the contact of their boxes against the rear side of the bracket, and when thus swung the cutters are entirely out of the path of the blanks approaching or departing from the jaws as the carrier B revolves. To swing the cutters into the position at which they may operate upon the blanks to dress away the burs, as described, there is provided a rock-shaft $p$, journaled in hangers 113 114, mounted on the under side of the table. On this rock-shaft a lever-arm $p'$ is made fast and extends across the lever-arm 108 in position to act against that arm when the rock-shaft $p$ is rocked and operate the lever against the tension of the spring 112. To the same lever-arm $p'$ a link 115 is pivotally connected, such link extending to and being pivotally connected with a cam-lever 116, which is fulcrumed on a stud 117, attached to the table. This cam-lever 116 extends into the path of a cam-abutment $g^{50}$ of the cam $g^5$ on the shaft $g$, and said cam-abutment and the cam-lever at the face thereof which is exposed in the path of the abutment are coöperatively shaped to cause at the proper time a swinging movement of the cam-lever as the shaft revolves, whereby said lever communicates to the rock-shaft the movement which causes the lever-arm $p'$ to operate the lever-arm 108 and swing the cutters $I^7$ inward to the ends of the grippers and against the burs of the blanks held in the latter. For the purpose of operating the pivoted jaw to cause the gripper to bite the needle-blank there is provided a lever 118, fulcrumed on a stud 119, which projects downward from the table. One end of the lever has an eye to receive the lower end of a bolt $I^5$, which extends down through the pivoted jaw and through the table to reach said eye, the head of the bolt engaging above the pivoted jaw. Below the eye on the lower end of the bolt is provided an adjustable stop $I^{50}$, cone-shaped on the upper surface, which faces the eye to accommodate the movement required and adapted to be adjusted and retained on the bolt by the adjusting-nut $I^{51}$ and jam-nut $I^{52}$. The opposite end of the lever 118 is engaged by a lever-arm $p^4$ of the rock-shaft $p$, which engages under and lifts that end of the lever, depressing the end which is connected to the bolt $I^5$, and thereby clamping the jaw immediately after the needle is lodged between the grippers. The same cam-lever 116 and abutment $g^{50}$, from which the movements of the gripping-jaws and grinders on the brackets I are derived, serve also to give operating movement to a gage device adjacent to the table C. This gage device comprises a vertical rock-shaft $q$, journaled in a standard 124 on the table $A^3$, having at the lower end a lever-arm $q'$, which is connected by a link 105 to the lever-arm 108, this connection being conveniently made by the same pivot-bolt which connects the link 106 to said lever-arm. At the upper end of the rock-shaft $q$ it has a lever-arm $q^2$, provided with a cam-slot $q^{20}$, which engages a pin K' on a gage-finger K, which is mounted and adapted to slide in the head of the standard 124, being guided therein by the pin which engages the cam-slot. The shape of the cam-abutment and cam-lever $g^{50}$ and 116 is calculated or derived in view of the several independent functions which they serve. In respect to the operation of the cutters on the frame I the movement to be obtained is as follows: First, the cutters must swing outward in ample time to be out of the path of the needle-blank as it is carried into position above the gripper-jaw; second, the closing movement of the jaws must be performed after the blank is in position between the grippers, such movement being completed promptly before the cutters reach the burs; third, the cutters must be brought up as quickly as possible after the needle has passed into the jaws until they are about to attack the burs; fourth, from that point they must be moved up so slowly that they will dress the burs away cleanly and smoothly both at the side and around the end to the center or axial line of the needle without being pressed against the bur so forcibly as to bend or mash them or tear them, as would be the case if they were advanced more rapidly than they could effectively cut away the material; fifth, having completed the dressing the cutters must be withdrawn as quickly as possible in order to permit the needle-blank at the farther side of the jaws to get away without colliding with the cutters; sixth, the jaws must be opened not an instant before but the first instant after the withdrawing movement of the cutters commences; but the opening of the jaws must be completed sufficiently to fully release the blank before the onward movement of the carrier is resumed. The adaptation of the abutment $g^{50}$ and cam-lever 116 to effect these several purposes will be apparent upon noting the several parts of the cam-surfaces which have to do with the several portions of the movement. Commencing the observation just at the conclusion of the grinding movement, it will be noticed that the cam-abutment $g^{50}$ has rotated to a point at which the end of the cam-lever is just about to pass off the slightly-eccentric portion $g^{51}$ onto the nearly-radial portion $g^{52}$ and that as the cam revolves through a very slight angle from this point onward the cam-lever will traverse the entire length of the said nearly-radial portion $g^{52}$, causing the cutters during that short time to make the entire swing away from the ends of the grippers, thus opening the path quickly for the blank to pass onward from the farther grippers and another blank to approach the first one. The point of the lever 116 will ride upon the concentric portion $g^{53}$ of the cam near the center while the cam is revolving through the large angle occupied by said concentric portion, amounting to about two hundred and fifty degrees, during which time the carriers B, C, and D are being rotated one step and a new blank is being brought into position between each pair of grippers. The grinders are now swung back quickly toward the grippers, ready to commence to operate on the burs; but in the meantime the jaws are closed tightly, both operations being effected by the cam-abutment $g^{50}$ coming into contact with the lever 116 first at the swell $g^{54}$, which is formed to prevent the encounter being of the nature of a blow, and a little later at the extreme point $g^{55}$ of the cam-abutment which collides with the side of the lever, giving the benefit of the longest leverage on the cam against the shortest leverage on the lever, and thus giving the most rapid swing movement to the cutter. This continues until the corner of the cam-abutment runs off the portion $g^{28}$ of the face of the lever 116 and reaches the portion $g^{29}$, which now stands very nearly concentric with the lever and so very nearly coincides with the path of movement of the forward point of the cam-abutment, which will from this point on produce very little movement of the lever, such movement as is caused being due to the slight eccentricity of the portion $g^{51}$ of the cam, which during movement of about thirty degrees from this point gives to the lever an almost imperceptible movement, advancing the cutter during the entire thirty-degrees movement only the distance during which the cutters are acting upon the very small burs and dressing them off from the blank.

In order to make the work of the cutters $I^7$ effective for its purpose, which is to produce the exact shape desired at the head of the needle in the plane transverse to the direction in which the eye is pierced, the cutter must be very accurately adjusted relatively to the grippers, and no lost motion or play must be permitted between the two at the instant of action. For the purpose of insuring such accuracy the shaft-bearings of the cutters $I^7$ are provided with bushing-sleeves $I^{74}$, and the cutter-shaft is longitudinally stopped at both ends of the sleeve, the cutter or its jam-nut at the forward end affording the stop at that end and the pulley $I^{76}$, retained and adjusted longitudinally with respect to the shaft by the nuts $I^{77}$ and $I^{78}$, affording the stop at the rear or outer end. These sleeve-bushings are exteriorly threaded at one end, and their seats at that end in the boxes $I^{71}$ are interiorly threaded to receive them, and at the rear end they have spokes or flanges I^75, by which they may be rotated to adjust them longitudinally in the boxes I^71. By this adjustment it will be seen that the cutter can be set exactly at the desired position, so that the recess $i^7$ in its periphery, which is conformed in axial planes to the desired outline of one side of the needle-head from a point below the eye up to and around the end to the center point, may be brought up against just that portion of the head and may thus shape it accurately to the precise outline which has been impressed by the dies in the press G.

In order to prevent any possibility of the cutter moving by acquired momentum or otherwise so far inward in its working movement as to cut or be dulled against the gripper-jaws, I provide adjustable stop-screws $i^2$ and $i^{20}$, set through outside lugs $i^3$ and $i^{30}$ on the journal-boxes I^71 and on the frame I. These screws may be set toward and from each other, so as to limit positively the approach of the cutters to the gripper-jaws.

It will be noticed that the pivotal axes of the spindles I^72, about which the cutters and grinders I^7 swing to act on the needle-blanks, are substantially in lines which intersect the lines of the axes or direction of length of the needle-blanks at the position occupied by the latter when the cutter operates upon them; also, that the face of the cutter, which has the conformity to the desired outline of the blank, is in general—i. e., considered with reference to the extent as a whole and without regard to minor detail deflections of all lines in the direction of such conformity—contained in planes which are radial to the axes of said spindles, respectively. This is desirable, because it tends to make the finishing action of the cutter on the blank direct—that is, without any movement longitudinal with respect to the blank or such as it is commonly described as a "drawing" or "draw-cut" movement.

It may be noticed that during the movement of the lever which causes the cutter to swing in rapidly before the very slow movement commences the link is operating the rock-shaft $q$ to thrust out the gage-finger to properly set the needle-blank in the chuck on the carrier C, which at this point stands opposite the gage-finger. This movement, however, may be performed at any stage while the carriers stand at rest, and the shape of the cams need not be modified in any respect in order to accommodate or time this movement.

As the chucks on the table B each successively come into line with a chuck on the table C and just before they halt at the conclusion of the last step movement which brings them into such position the tail of the pivoted jaw of the chuck passes under an overhanging shoe 151, mounted rigidly on the table, and thereby the jaw is opened and the needle-blank released from its grasp. The carriers being locked in this position, the jaw remains open during the entire halt of the carriers. At this point, as already described, the opposed chuck on the carrier C is thrust forward to receive the blank. In order to open the jaws of the chuck on the carrier C when it is thrust forward without the necessity of determining the point at which its rotation about its axis is arrested, the device termed a "transfer" is located between the carriers B and C. A transfer similar in certain parts is also located between the carriers C and D. This transfer with all its appliances serves merely the purpose of tripping open the jaws of the retaining-chucks of the succeeding carrier when such chucks are thrust forward and permitting them to close upon the blank which they receive from the outside chuck of the preceding carrier and to withdraw again past the tripping device without being again opened. The detail devices of the transfers between the carriers B and C are identical in form and function with the correspondingly-lettered parts of the transfer which is located between carriers D and C, and which are seen most fully in Figs. 38 and 39, to which, with Fig. 9, reference may be made for understanding the following description. For convenience of distinguishing the two transfers the one between carriers B and C as a whole, with all its appliances, is designated by the letter Q, and that between carriers C and D, with all its appliances, is designated by the letter Q'. Parts on the two transfers which are the same in form are indicated by the same letters. Each of the transfers comprises a ring J, which is mounted, originally, upon the top frame A^3, the axis of the ring being in line with the centers of the two carriers, between which it is located in the plane of the axes of the chucks on said carriers. The ring J has a central opening J', and pivoted on the face of the ring toward the succeeding carrier there are trip-fingers J^2, which extend radially toward the center of the ring and project beyond the margin of the central aperture J', themselves meeting at their inner ends and forming by said ends a complete marginal boundary of a reduced aperture concentric with the aperture J'. Each of these trip-fingers is provided with a spring J^3, tending to hold it back against the face of the plate—that is, at the bottom of the recess in said face, which is provided in order to seat and guide it. When the chuck on the succeeding carrier is thrust forward while still rotating, it passes through the reduced centre aperture bounded by the ends on the trip-fingers, and at whatever position the pivoted jaw of the chuck stands when it enters the ring said jaw will encounter the end of one (or sometimes two) of the trip-fingers, which as to any pressure against them in the direction of the thrust of the chuck operate as a rigid ring and trip the jaw open as the chuck is thrust through such ring. Each of the pivoted jaws of the chucks of this carrier is reduced or cut back at the rear end, forming a shoulder 154 and permitting the jaw to close again after said shoulder passes the trip-finger. In the first portion of the thrusting movement, during which the jaw is opened, as described, the end of the chuck is approaching the end of the blank offered to it by the opposed chuck on the preceding carrier. By the time the chuck is opened this blank is reached and enters the open jaw, which remains open during sufficient further advance to permit the blank to be fully received in the chuck. At this stage the shoulder runs off the trip-finger and the jaw closes and grasps the blank, and immediately thereafter the retreating movement of the chuck on the table C commences, and the shoulder 154 now engages one or sometimes two of the trip-fingers, which yield toward the carrier C and permit the chuck to withdraw, notwithstanding the presence of the shoulder and the fact that the jaw is closed. It will be seen that the purpose served by the plurality of the trip-fingers constituting a complete ring is to insure the presence of a trip-finger in the path of the pivoted jaw of the chuck when it is thrust forward at whatever position they may occur, thus preventing the necessity of arresting the rotary movement of the chuck at any particular point, and, indeed, prevent the necessity for arresting it at all during the forward thrust, though it will be understood that the forward movement causing it to become disengaged from the driving-pinion causes it to come to rest quite promptly and to be free from any positive rotating action or tendency by the time the jaw has closed, so that there is no danger of damage to the trip-finger while the jaw is withdrawing past them.

The transfer of the needle-blank from the chucks on the table C to the chucks on table D is effected at the same time as the transfer above described, and as to the action of the transfer device with respect to the chucks on the carrier D, which receive the blank, the operation is precisely the same as that just described. In this case, however, the delivering-chuck advances as well as the receiving-chuck, and the advance movement of the delivering-chuck is not only necessary to take it out of driving relation to the gear-pinion, and so permit its rotary motion to be arrested, but is further taken advantage of to open the jaw and release the blank. This latter process is performed by a ring 160, which is mounted at the center of the spider 161, secured to the transfer-ring Q. The ring 160 is of suitable diameter to cause the pivoted jaw of the chuck as the latter enters the ring to collide with the ring and to be forced open by the thrust movement of the chuck and to be held open until the chuck withdraws. The friction of the pivoted jaw of the chuck against the ring being dependent upon the tension of the spring which actuates the jaw with a tendency to hold it shut might be too great to be overcome by the retractile force of the spring whose function it is to withdraw the chuck, and since if this should happen in any instance the next step movement of the carrier D would either damage the chuck or the driving mechanism, because the rotating step movement would be resisted by the engagement of the chuck in the ring, I make provision to prevent such extreme friction between the parts by mounting the ring 160 rather loosely in a rabbet formed in the margin of the central opening of the spider and providing spring-fingers 163 163 163, secured to the spider and lapping onto the ring and engaging in notches 162 in the forward edge of the same, thus tending to hold it inward in its rabbet-seat and also preventing the chuck from rotating it. If the chuck when thrust into the ring tends to adhere to it, the spring-fingers 163 will yield as the chuck is retracted by the spring 123, and the initial movement thus permitted will tend to break the frictional grasp between the chuck-jaw and the ring and allow the chuck to come out freely. When the blanks have been received by the chucks on the carrier C, they are carried past the several grinding, dressing, and polishing devices which are mounted and operated adjacent to their path as they move with this carrier, the first three of these—the cutter L, the grinding-roll M, and the grinding-roll N—being similarly mounted and driven in a perfectly similar manner, and as to the detail structure by which they are made universally adjustable the carriers of these cutters and grinders are the same as those of the polishing-belts P P and S. (Illustrated in detail in Fig. 47.) The same letters are applied to corresponding parts in all these carriages and adjusting devices, and for the full understanding of this description reference may be had to said Fig. 47, in addition to Figs. 1 and 6, which show the general location and arrangement of these parts. The cutter or grinder L, M, or N, as the case may be, is journaled, and the carriage of the polishing-belt is pivoted in the forward end of a fork-frame 300 and 300$^a$, respectively, having a spindle 301, which is mounted and adjustable longitudinally and rotatably and arranged to be secured as adjusted in a sleeve or collar 302, which has a pin 303 at right angles to the bearing of the spindle 301 and similarly adjustable and arranged to be secured in a sleeve 304, which is secured, by means of its stem 305, in the segment extension A$^5$ of the table A$^3$. By means of the several spindles and sleeve connections described any adjustment desired—horizontal, vertical, or angular—may be given to the cutter or grinder mounted in the journal in the forward end of the fork-frame, as stated. A rotary motion is communicated to the cutter or grinder by a belt over a small pulley 306 on the shaft of the grinder. The pulleys 15, 16, and 17 on the shaft $a$ drive the three grinders L, M, and N. The next grinding device is the disk O, which is mounted and driven precisely in the same manner as the grinders L, M, and N; but this disk is mounted on its shaft outside the arms of its fork, the driving-pulley 306 being mounted on the shaft between said arms. After passing these dressing and grinding devices the blank reaches the polishing-belts P P, which are mounted and driven in a precisely similar manner, being different only in the coarseness or fineness of the surface or material used thereon for the polishing. These polishing-belts are caused to travel over two pulleys 310 and 311, journaled at opposite ends of a rocking frame 312, which is itself pivotally mounted between the arms of a fork-frame similar to the above-described in the same position in which the cutters or grinders of the preceding devices are journaled. This rocking frame extends back over the cross-bar of the fork and is provided with screws 313 313, set through it, one screwed into and the other impinging on the rear part of the fork to adjust its tilt, the head of the first screw serving as a stop above the frame, (see Fig. 48,) the intention being to adjust this frame so that the surface of the belt traveling over the rollers journaled in it shall have a slight inclination corresponding approximately, or as accurately as may be, to the taper of the needle-blank which is to be polished as it passes over the belt, so that the entire tapered surface may be accurately reached and polished. The blanks are held on the cutters and polishing-belts while their points are being formed and dressed by means of suitable overhanging guards 307 307, &c., whose lower edges are suitably beveled at the entering ends to insure the entrance of the blanks under them and which throughout their entire extent are calculated to cause the needle passing under them and onto the cutters or belts to be held with such degree of pressure as the stiffness of the needle will permit onto the cutter in order to be properly acted on thereby. The polishing-belts require driving-pulleys 314 315, which are suitably journaled in brackets 316 and 317, adjustably mounted on the frame and driven by belts deriving motion from the pulleys 19 and 20 on the shaft *a* and passing over pulleys 318 and 319, rigid with pulleys 314 and pulleys 315, respectively. Suitable guide-pulleys are necessary to direct belts from the pulleys 19 and 20 to the pulleys 314 and 315. These are for the former 320 and 321 and for the latter 322 and 323. The cutters or grinders L, M, N, and O are designed to be adjusted with relation to the direction in which the blanks extend and also with relation to the direction in which the blanks move laterally over or past the grinding or cutting surfaces, so as to yield specific results as follows: First, the blank as it approaches the first grinder or cutter is cylindrical and has a square-cut end formed by the shear cut which severed it from the running wire. In order to grind off this end to reduce it to a point, the cutter must attack it with a movement toward the end rather than from the end back, since the latter movement would tend to bend the blank. The same thing is to a degree true at all stages of the grinding process, and all the grinders therefore revolve in the direction to draw toward the point as they impinge upon the blank. The first grinder or cutter, however, having to operate upon the cylindrical blank and to make the first rough reduction thereof toward the desired pointed form, is arranged to commence its action by grinding off first a little at the very end and gradually deepening its cut—that is, working farther back on the cylindrical blank—as the latter advances over it. If the blank were brought onto the cutter in such manner as to cause the latter to cut an annular groove or hollow back of the point and afterward dress away the material from such annular groove to the point, the pressure as the cutter worked toward the point would bend or spring the wire at the groove already formed and the needle would wabble on the grinder and be cut improperly. To prevent this, the cutter is mounted in such relation to the path of movement of the blank that the first encounter of the latter therewith is at the extremity of the blank, the contact working gradually back from the extremity as the blank moves laterally over the length of the grinder. The relation which yields this result is that the chord of the arc traced by the extremity of the blank in traveling over the length of the cutter diverges obliquely outward from the vertical plane of the axis of the cutter. The remainder of the grinders M, N, and O operate, however, in the opposite manner—that is, commencing their work upon the blank back of the point at which they end, working toward the point as the blank advances over them—and in order to operate in this manner the grinders M and N are mounted so that the chord of the arc traced by the extremity of the blank passing over them diverges obliquely inward from the vertical plane of their respective axes. The cutter O being a disk of much larger diameter than the cylindrical grinders M and N is made to operate in the same general manner—that is, working from the inner end of the taper off toward the point—by having its shaft set in a direction making an angle of about thirty degrees with a vertical plane through the center of the disk radial to the carrier, and to cause it to correspond nicely with the taper of the needle its axis is slightly inclined downward at the inner end. The grinder M is less oblique than the grinder N and works over a limited range of the blank, ending with the point. The grinder N being set more obliquely covers a longer portion of the taper and produces the taper farther back on the wire, while the disk cutter O by reason of its greater diameter and special angle is arranged to operate over the entire taper of the needle, completing its outline in one sweeping movement and removing any possible nodes or lines of demarcation between the sweep of the preceding cutters.

When the blanks are delivered to the chucks on the carrier D in the manner which has already been described, they are ready to be polished at the head end, which is carried protruding by these chucks. The first action, however, to be performed is to insure the equal protrusion of all the blanks. For this purpose there is provided the gage, comprising a vertical rock-shaft $r$, which is journaled in a suitable standard 325, mounted on the table. This rock-shaft has a lever-arm 326, which projects rearward and is loosely connected with a link 327, which is attached loosely to the horizontal arm of the bell-crank lever $F^5$, which is primarily provided to operate the press F, as already described. At the upper end of the rock-shaft $r$ it has a lever-arm 328, provided with a slot which engages a pin 329, projecting from the gage-finger R, which is mounted in an arm of the standard 325 and provided with a spring 331, tending to retract it, the link-and-lever connections described being arranged to thrust it out. The movement of the lever $F^5$, by which it operates the press F, being made to occur at the time of rest of the carriers, is in proper time to actuate this gage-finger, which is located so as to be in line with one of the chucks on the table D when the table halts, and being thrust out at this stage it encounters any blank which may chance to protrude too far and forces it into the limit determined by the adjustment of the gage-finger. Having passed the gage-finger, the blanks are brought to a polishing-belt S, which is mounted and driven in a manner similar to the polishing-belts P P, the power being derived as from the pulley on the shaft $b$.

After passing the polishing-belt S the needles are ready to be delivered, and for this purpose there is provided in line with one of the positions of rest of the chucks a pair of feed-rolls 400 and 401, the former mounted in a fixed bearing T' in the bracket T, which is mounted on the frame, and the latter journaled in a box $T^2$, which is pivoted to the bearing T', so as to have a slight range of movement toward and from the first roll. Spur-gears 402 and 403 on the rear ends of the shafts of these rolls intermesh and cause them to have like rotary motion, which is derived by means of a pulley 404 on the shaft of the lower roll, which is driven by a belt 405 from a pulley 25 on the shaft $b$. Opposite these feed-rolls, between the same and the chuck from which they are to receive the blank, there is located a ring 406, into which the chuck is thrust to deliver the blank and which is encountered by the pivoted jaw of the chuck as it is thus thrust out, with the effect of opening the jaw and releasing the blank, which at the same time is thrust between the revolving feed-rolls and frictionally grasped by them, so that the instant the chuck releases the blank it is shot through the rolls. Just beyond the feed-rolls and in position to receive the blank thus delivered through them there is located the straightening mechanism. This mechanism consists of a steel roller Z, which, however, is not smoothly cylindrical, but is bounded by a succession of segmental surfaces Z', each portion partly concentric and partly slightly eccentric, separated by short radial steps $Z^2$ less than the diameter of the needle-wire. This roller bears against a steel spring-plate 407, which is set so as to press strongly against the roller and which is slightly curved to approximately conform to the roller through several degrees of the extent of each of the segmental surfaces. The roller is rotated from shoulder to shoulder with a step-by-step movement, which is communicated to it by means of a pawl 408 on the lever 409, which is fulcrumed on the roller-shaft, the pawl engaging a ratchet 410, which is mounted on the same shaft adjacent to the lever. A link 411, connected to the lever and to a crank-wrist 412 on the wheel 413, gives the roller one step movement for each complete revolution of the wheel 413, and said wheel is rotated by means of a chain 414, which is driven by a sprocket-wheel 415 on the end of the shaft $c$. The sprocket-wheels 413 and 415 are so proportioned with respect to the speed of the shaft $c$ as to give to the roller one step movement for each step in the rotary movement of the carriers B, C, and D, so that the roller receives one needle for each of its step movements. The needles lodging in the sharp angle between the spring-plate 407 and the immediately adjacent segmental surface of the roller and being rolled between the roller and the spring-plates while exposed to the severe pressure of the latter upon the former are straightened if they have any irregularities when they are delivered by the delivery-rolls, and at the lower side of the straightening-roller they drop from between the same end of the plate into a receptacle. The very slight shoulders or radial steps $Z^2$, formed, as described, in the periphery of the straightening-roller Z, being formed by notches whose slope to the shoulder is in a short arc eccentric to the cylindrical periphery of the roller, being in height less than the diameter of the needle-blanks, operate to prevent any needle going through without being properly grasped between the rotating surfaces of the roller and the opposed surfaces of the spring-shoe or pressure-plate, and the result of this construction and of the slight curvature of the pressure-plate, as described, is to cause the blanks to be rolled over several times each before they are carried beyond the range of pressure of the roll and plate.

It will be noticed that there are two sorts of actions performed on the blanks in the operation of this machine: first, the striking or instantaneous action performed upon the head end while the blanks are carried upon the table B; second, the grinding actions, which are performed upon the opposite ends of the blanks while they are carried by the chucks on the carriers C and D. The first set of actions being, as remarked, instantaneous as far as the blank is concerned and being necessarily performed while the carrier B stands at rest, (and therefore while the carriers C and D also stand at rest,) it is desirable and tends to facilitate rapid action of the machine as a whole that these actions should be performed in the shortest possible time and that therefore the period of rest or halting of the carrier should be as short as possible, so that the largest possible proportion of each complete rotation of the primary cams on the shaft $g$ shall be employed in giving to the carriers their step-feed movement, thus causing the blanks to spend as large a portion of the total time in contact with the dressing mechanism pertaining to the carriers C and D. Obviously so far as these processes are performed the halts of the carriers are waste time, while, on the other hand, so far as the processes performed while the blanks are carried by the carrier B are concerned the step movements are waste time. Since, however, the maximum rate at which the machine as a whole can turn out finished needles is dependent upon the maximum rate at which it can perform the slowest process or the one requiring the longest time, the effectiveness of the machine in this respect will be furthered by so planning as to reduce to the minimum the waste time in these slowest processes. For that purpose I construct the cam $g'$ so that about one-quarter of its rotation only is required to retract the cross-head 70 and draw the pawls back around the carriers respectively, while three-quarters of its rotation is occupied in giving the carrier-actuating movement to the cross-head. It is important also that the blanks should not stand at rest at any time on the grinding devices, since that would result in producing grooves or dull places in said devices, to the damage of the subsequent work. The halt of the carrier therefore is made while the blanks stand at the interval between the consecutive grinding devices.

The operation to dress away the lateral burs performed by the mechanism on the frame-bracket I falls in the class of actions which is performed during the short interval of rest or halting of the carriers, and the necessity of both closing and opening the jaws of that device and advancing and retracting the grinders to the place of action upon the burs, as well as holding them long enough in contact with the burs to dress them away properly, as described, all during this short interval of rest necessitates the construction of the devices so that the preliminary movements—that is, all movements preceding the actual contact of the grinders with the burs—shall be performed very quickly, so that the largest possible proportion of the time of the halt may be devoted to the actual grinding of the burs. That this is accomplished may be most clearly seen by observing the outline of the cam-abutment $g^{50}$, the whole of whose active portion is comprised within about one hundred degrees, or less than one-third of the circle of its rotation, and the slightly-eccentric portion $g^{51}$, which corresponds to the period of contact of the grinders with the burs and causes the very slow advance of the grinders against the burs, as already described, comprises nearly two-thirds of this one-third of the entire circumference, the remaining thirty-odd degrees being all that is required to perform all the preliminary movements of the grinders and jaws in question.

I claim—

1. In a needle-making machine, in combination with a carrier, and a holder thereon for a needle-blank to be carried laterally thereby; a mechanism for shaping said blank laterally at a side which traverses the plane of said lateral movement, said mechanism comprising a forming device having a face which is conformed to the longitudinal outline to be produced on said side of the blank, a frame or support for such forming device constructed and arranged to be moved in the plane of said lateral travel of the blank, and in a direction in said plane transverse to said conformed face, and mechanism for moving the frame in such plane to advance said face of the forming device therein against the side of the blank.

2. In a needle-making machine, in combination with a carrier and a holder thereon; a needle-blank to be carried laterally thereby; a mechanism for shaping said blank laterally at a side which traverses said plane of lateral movement of the holder, said mechanism comprising a frame or support constructed and arranged to swing in the plane of said lateral movement about a pivotal axis which intersects the line of the axis of the blank, and a forming device mounted on such swinging frame or support having a face conformed to the longitudinal outline to be produced on the blank, such face being situated when it makes contact with the blank in a plane at right angles to the plane of travel of the blank and radial to said pivotal axis.

3. In a needle-making machine, in combination with a carrier and a holder thereon for a needle-blank to be carried laterally thereby with one end protruding; a mechanism for forming such blank, on the protruding portion, while it is held by the holder, at a side which traverses the plane of such lateral movement, such forming mechanism comprising a rotating cutter having the axis of its rotation substantially in a plane containing the longitudinal axis of the blank, and an operating-face which, in section radial to the axis of revolution, is conformed to the longitudinal outline to be produced on the blank; a shaft-carriage for such cutter which is movable in the plane of the movement of travel of the blank and in a direction in said plane to advance such conformed face of the cutter against the side of the blank, and mechanism for so moving said carriage.

4. In a needle-making machine, mechanism for forming the longitudinal outline of one end of the needle, which comprises suitable means for holding the blank with the end to be formed exposed; a cutter having a cutting movement in the direction of a plane transverse to the length of the blank; the cutting-face of the cutter being conformed in a plane transverse to the cutting movement, to the longitudinal outline to be produced on the blank; a carriage for such cutter and mechanism for giving the cutter its cutting movement, and for moving the carriage to advance the conformed face of the cutter directly against the side of the blank.

5. In a needle-making machine, mechanism for forming the longitudinal outline of one end which comprises suitable means for holding the blank with the end to be formed exposed; a rotating cutter having a cutting-face which in planes radial to the axis of its rotation is conformed to the longitudinal outline to be produced; a carriage for such cutter; mechanism for revolving the cutter in its bearings on such carriage, and mechanism for moving the carriage to advance the conformed face directly against the blank in a direction radial to the cutter's rotation.

6. In a needle-making machine, mechanism for forming the head laterally, which comprises suitable means for holding the blank with the head laterally exposed and non-rotating; a rotating cutter having a face which is conformed in planes radial to the axis of rotation to the outline of the longitudinal radial section of the head in a plane transverse to that in which the eye is pierced; a shaft-carriage for such cutter, and mechanism for moving it to advance said face of the cutter directly toward and against the side of the head of the blank.

7. In a needle-making machine, in combination with a carrier, a holder thereon for needle-blanks arranged to hold the same with one end protruding; means for giving the carrier step-by-step movement with rest intervals in direction to carry the blanks laterally; mechanism for forming such blanks at the side which traverses the plane of such lateral movement, said forming mechanism comprising a forming device having a face conformed to the longitudinal outline to be produced on the blanks, a frame or support for such forming device constructed and arranged to be moved in the plane of the lateral movement of the blank and in a direction in said plane substantially at right angles to said conformed face of the forming device; mechanism connected and actuated in the same train for giving the carrier a step-by-step movement, and for moving the frame to advance said face of the forming device against the side of the blank held in the holder during a rest interval of such step-by-step movement of the carrier.

8. In a needle-making machine, in combination with a carrier, and means for giving the same step-by-step movement with rest intervals, a holder thereon for a needle-blank adapted to hold such blank with one end protruding in a position to be carried laterally by said step-by-step movement of the carrier; a mechanism for forming such blank at a side which traverses the plane of such lateral movement, said mechanism comprising a forming device having a face which is conformed to the longitudinal outline to be produced on the blank; a frame or support for such forming device, which is pivotally supported adjacent to the path of the blank thus carried, the axis of such pivotal support being in a plane at right angles to the plane of the travel of the blanks, and containing the axis or longitudinal dimension of said blank at the position of rest thereof, and mechanism for swinging such pivoted frame about its axis connected and operated in the train which gives to the carrier such step-by-step movement and timed to swing the frame as described at such rest interval.

9. In a needle-making machine in combination with a carrier, and means for giving the same step-by-step movement with rest intervals; a holder thereon for a blank to be carried laterally thereby; mechanism for forming such blank laterally, which comprises a frame or support located adjacent to the path of the blank thus carried, and constructed and arranged to swing in the plane of the path of the blank, and about a pivotal axis which is in a line intersecting the axis of the blank at one of its rest positions, a forming device mounted on such support or frame and having a face conformed to the longitudinal outline to be produced laterally on the blank, such face being situated at a plane radial to the pivotal axis of the swinging frame; and mechanism for so swinging the frame, connected and operated in the same train with the mechanism for giving the carrier its step-by-step movement, and timed to operate at a rest interval of such step-by-step movement.

10. In a needle-making machine, in combination with a carrier and mechanism for giving the same step-by-step movement with rest intervals; a holder thereon for a blank to be carried laterally thereby; a rotating cutter having a face conformed in planes radial to its axis of rotation to the longitudinal outline to be produced on the sides of the blank, and a movable carriage on which the cutter is mounted and mechanism for moving the carriage to advance the cutter into and out of the path of lateral movement of the blank and against the side of the same actuated in the train which gives to the carrier its step-by-step movement and timed to so advance the cutter during a rest interval of such step-by-step movement.

11. In a needle-making machine in combination with a carrier, and means for giving the same step-by-step movement with rest intervals, a holder for a blank to be carried laterally thereby; a mechanism for forming such blank laterally comprising a shaft-carriage located adjacent to the path of the blank thus carried, pivotally supported and adapted to swing about such pivot in the plane of the path of the blank, the pivot of such shaft-carriage being in the line of the axis of said blank at a rest position thereof; a rotatable forming device having its shaft journaled in the shaft-carriage, and having a face conformed in a plane radial to the axis of rotation to the longitudinal outline to be produced on the blank; such face being situated substantially in a plane radial to the pivotal axis of the carriage.

12. In a needle-making machine in combination with a carrier having a step-by-step movement with rest intervals, and a holding device thereon constructed and arranged to hold a blank without rotation while it is carried laterally; mechanism located adjacent to the path of the blank thus carried at one of the rest positions thereof, comprising a dressing-wheel and means for rotating it about an axis which is located in the plane of the path of the blank; such dressing-wheel being peripherally conformed to the longitudinal outline which is to be produced on the blank, and mechanism for moving such dressing-wheel bodily to advance its axis laterally toward and its said conformed periphery against the blank laterally with respect thereto, said mechanism being operated at the rest interval of the carrier's movement and while the blank is held by the holder thereupon.

13. In a needle-making machine in combination with the carrier, and means for giving the same step-by-step movement with rest intervals, and holders thereon for the blank being carried laterally thereby; mechanism for forming such blank laterally comprising a pivoted carriage having its pivotal axis at right angles to the plane of the path of the blank; and a forming device mounted on such carriage having a face conformed to the longitudinal outline to be produced laterally on the blank; such face being situated substantially in a plane radial to the pivotal axis of the carriage.

14. In a needle-making machine in combination with a carrier, and a holder thereon for a blank to be carried laterally thereby, mechanism for giving to the carrier step-by-step movement with rest intervals, a mechanism for forming such blank laterally comprising a frame or support mounted adjacent to the path of the blank thus carried upon a pivotal support which adapts it to have a swinging movement in a plane parallel to the plane of carrying movement of the carrier; a dressing-wheel on said frame adapted by such swinging movement of the latter to be advanced against and withdrawn from the blank, and mechanism for operating such swinging frame to move the dressing-wheel into and out of the path of movement of the blank at a rest interval of the carrier's movement while a blank is held in the holder.

15. In a needle-making machine in combination with the carrier, the holder thereon for the blank to be carried laterally thereby, mechanism for forming such blank laterally which comprises a pivoted carriage having its pivotal axis at right angles to the plane of the path of movement of the blank; a rotating forming device mounted on such carriage having its axis of rotation in a plane at right angles to the pivotal axis of the carriage, and having a face which is conformed in a plane radial to its axis of rotation to the longitudinal outline to be produced on the blank; and suitable means for swinging such pivotal carriage about its pivot to cause the forming device to approach and withdraw from the blank.

16. In a needle-making machine in combination with the carrier, and means for giving the same step-by-step movement with rest intervals; a holder thereon for the blank to be carried laterally thereby; a mechanism for forming such blank laterally which comprises a carriage pivoted at a fixed bearing adjacent to the path of the blank thus carried, having its pivotal axis at right angles to the plane of the path of the blank, and in a line intersecting the axis of the blank at a rest position thereof; a forming device mounted on such carriage, having a face conformed to the longitudinal outline to be produced laterally on the blank, and situated substantially in a plane radial to the pivotal axis of the carriage.

17. In a needle-making machine in combination with a carrier, and mechanism for giving the same step-by-step movement with rest intervals; a holder thereon for a blank to be carried laterally thereby, constructed and arranged to carry the same with one end protruding; mechanism for forming such blank laterally, comprising two forming devices having their faces conformed respectively to the longitudinal outlines to be produced on opposite sides of the protruding end; carriages for such forming devices supported adjacent to the path of movement of the carrier constructed and arranged to be moved in planes parallel to the plane of the path of the blank to advance said conformed faces of the forming devices in opposite directions directly against the opposite faces of the protruding end of the blank; mechanism for giving to such carriages such movement actuated in the train which gives to the carrier its step-by-step movement and timed to so advance and withdraw the carriages at a rest inter al of the step-by-step movement of the carr.

18. In a needle-making machine mechanism for forming the head laterally which consists of suitable means for holding the blank, and a pair of rotating cutters having respectively faces which are conformed in planes radial to the axis of rotation to the longitudinal outlines to be produced on opposite sides of the needle-head, shaft-carriages for such cutters and mechanism for moving them to advance said faces of the cutters directly against opposite sides of the head of the blank.

19. In a needle-making machine, in combination with a carrier and mechanism for giving the same step-by-step movement with rest intervals, a holder thereon for a blank to be carried thereby constructed and arranged to be carried with one end protruding; mechanism for forming such blank laterally comprising two rotating cutters having faces conformed in planes radial to the axis of rotation to the longitudinal outline to be produced on the blank; shaft-carriers for such cutters respectively supported adjacent to the path of movement of the carrier constructed and arranged to be moved to advance the conformed faces of the forming devices in opposite directions directly against the opposite faces of the protruding end of the blank, and mechanism for giving the carriers such movement actuated in the train which gives the carrier its step-by-step movement and timed so as to advance and withdraw the carriages while the blank is held in the holder and during the rest interval of the step-by-step movement.

20. In a needle-making machine in combination with a carrier and a plurality of holders thereon for blanks to be carried laterally thereby, mechanism for forming such blanks laterally, comprising two pivoted carriages whose pivotal axes intersect the lines of the axes respectively of two of the blanks carried by the carrier, and forming devices mounted on such carriages having faces conformed respectively to the longitudinal outlines to be produced on the opposite sides of the blank, such faces being situated substantially in planes radial to the pivotal axis of the carriages respectively.

21. In a needle-making machine in combination with a carrier and a plurality of holders thereon for blanks to be carried laterally thereby; mechanism for dressing such blanks laterally, comprising two rotating cutters having their proximate faces conformed in planes radial to the axes of rotation respectively to the longitudinal outlines to be produced on the blank, and pivoted shaft-carriages for such cutters respectively, having their pivotal axes at right angles to the axes of the blanks respectively on which the cutters operate.

22. In a needle-making machine in combination with the carrier, and a plurality of holders thereon for blanks to be carried laterally thereby, mechanism for giving to such carrier step-by-step movement with rest intervals, two rotating cutters having their axes respectively in the same planes with the axes of two blanks at a rest position of the carrier; pivoted shaft-carriages for such cutters respectively having their pivotal axes at right angles to such planes respectively; the cutters having faces conformed in radial planes to the longitudinal outline to be produced on the blank, and mechanism for swinging said carriages about their respective pivots during a rest interval of the carrier.

23. In a needle-making machine in combination with the carrier and a plurality of holders thereon for blanks to be carried laterally thereby, mechanism for giving to such carriers step-by-step movement with rest intervals, two rotating cutters or dressing devices having their axes respectively in the same planes with the axes of two blanks on the carrier at a rest position; pivoted carriages for such cutters or dressing devices having their pivotal axes at right angles to such planes respectively; said cutters or dressing devices having faces toward the blank respectively conformed in radial planes to the exterior longitudinal outline to be produced on the blank; and mechanism for swinging said carriages in opposite directions about their respective pivots during a rest interval of the carrier, to cause the cutters or dressing devices to advance from opposite directions against the opposite sides of the blanks upon which they respectively act.

24. In a needle-making machine, in combination with the devices for holding the blank without rotation and with its end protruding and for carrying it laterally with a step-by-step movement with rest intervals; press mechanism located adjacent to the path of the blank thus carried having dies adapted to impress the outline of the head; a cutter rotating transversely to the plane of the path of movement of the blank; a carriage on which such cutter is mounted, and mechanism for moving the carriage to carry the cutter into and out of the path of the blank and laterally against the same in a direction transverse to the direction of the dressing movement of the cutter upon the blank; such movement of the carriage being timed to occur after the blank has been carried past the press mechanism.

25. In a needle-making machine, in combination with the devices for holding the blank without rotation and with its end protruding and for carrying it laterally with a step-by-step movement with rest intervals; press mechanism located adjacent to the path of the blank thus carried having dies adapted to impress the outline of the head; a cutter rotating transversely to the plane of the path of movement of the blank; a carriage on which such cutter is mounted, and mechanism for moving the carriage to carry the cutter into and out of the path of the blank and laterally against the same in a direction transverse to the direction of the dressing movement of the cutter upon the blank; such movement of the carriage being timed to occur after the blank has been carried past the press mechanism and during a rest interval of the step-by-step movement of the carrier.

26. In a needle-making machine in combination with a device for holding a blank without rotation and for carrying it laterally with step-by-step movement and rest intervals; press mechanism located adjacent to the path of the blank thus carried, having dies adapted to impress the outline of the head, and mechanism located adjacent to the same path subsequent to the press mechanism comprising a forming device and a movable carriage on which it is mounted; the forming device having a face conformed to the longitudinal outline to be produced on the side of the blank; the carriage being constructed and arranged to be moved to advance said conformed face in a path which finishes in a direction substantially at right angles to such face into contact with the side of the blank, and suitable mechanism for so moving the carriage in a rest interval of the carrier's movement.

27. In a needle-making machine in combination with a device for holding a blank without rotation, and for carrying it laterally with step-by-step movement and rest intervals; press mechanism located adjacent to the path of the blank thus carried, having dies adapted to impress the outline of the head, and mechanism located adjacent to the same path subsequent to the press mechanism comprising a pivoted carriage and a forming device mounted thereon, the pivotal axis of the carriage being at right angles to the axis of the blank at a rest position of the carrier, and means for swinging the carriage about its pivot to advance the forming device laterally against the blank, said forming device having the face thus advanced conformed in a direction radial to the carriage-pivot, to the longitudinal outline to be produced on the side of the blank toward which it advances.

28. In a needle-making machine in combination with a device for holding a blank without rotation, and for carrying it laterally with step-by-step movement and rest intervals; press mechanism located adjacent to the path of the blank thus carried, having dies adapted to impress the outline of the head, and mechanism located adjacent to the same path subsequent to the press mechanism, comprising a rotating cutter or dressing device and a movable carriage on which it is mounted, such cutter or dressing device having a face conformed in planes radial to its axis to the longitudinal outline to be produced laterally on the blank; the carriage being constructed and arranged to be moved to advance the cutter with said conformed face foremost and its direction of conformity agreeing with the direction of the length of the blank, in a path which finishes in a direction substantially at right angles to such face, and suitable mechanism for so moving the carriage in a rest interval of the carrier's movement.

29. In a needle-making machine in combination with a device for holding a blank without rotation, and for carrying it laterally with step-by-step movement and rest intervals; press mechanism located adjacent to the path of the blank thus carried, having dies adapted to impress the outline of the head, and mechanism located adjacent to the same path subsequent to the press mechanism, comprising a pivoted shaft-carriage and a rotating cutter or dressing device journaled thereon, the pivotal axis of the carriage being at right angles to the axis of a blank at a rest position of the carrier, means for swinging the carriage about its pivot to advance a face of the cutter laterally against the blank, such cutter having the face thus advanced conformed radially to the longitudinal outline to be produced on the side of the blank toward which it advances.

30. In a needle-making machine in combination with a carrier and a plurality of holders thereon for blanks to be carried laterally thereby, mechanism for giving the carrier step-by-step rotation with rest intervals, press mechanism located adjacent to the path of the blank thus carried, having dies to impress the outline of the head, and mechanism located adjacent to the same path subsequent to the press mechanism comprising two pivoted carriages and forming devices mounted on them respectively, the pivotal axes of the carriages being in lines which intersect the lines of the axes respectively of two of the blanks on the carrier, and the forming devices having faces conformed respectively to the longitudinal outlines to be produced on opposite sides of the blanks, and situated in planes radial to the pivotal axes of the carriages respectively, and mechanism for swinging the carriages about their respective pivots to advance said conformed faces in opposite directions against the two blanks respectively during a rest interval of the carrier's movement.

31. In a needle-making machine in combination with a carrier and a holder thereon for blanks to be carried laterally thereby, mechanism for giving the carrier step-by-step rotation, with rest intervals, press mechanism located adjacent to the path of the blanks thus carried, having dies adapted to impress the outline of the head, and mechanism located adjacent to the same path subsequent to the press mechanism comprising two pivoted carriages and forming devices mounted on them respectively, the pivotal axis of the carriages being at right angles to the plane of the path of movement of the blanks, and the forming devices having faces in planes radial to the axes of the carriages respectively, and conformed in the direction of the plane of swinging movement of the carriages and of the axis of the blanks to the longitudinal outline to be produced on opposite sides of the blanks, and mechanism for swinging such carriages to carry the forming devices in opposite directions, and to carry each laterally against a blank and away from the same and out of the path thereof during a rest interval of the carrier's movement.

32. In a needle-making machine, mechanism for forming one end portion of the needle, comprising a holder which grasps the blank by the other end and carries it bodily laterally; a gripping device having a seat into which the end to be formed is thus carried which embraces the blank for a distance on both sides of a longitudinal diametric plane thereof and which leaves a portion at one side of the blank exposed beyond the plane of the outer surface of the gripping-jaws; the cutter or dressing device and a movable carriage on which it is mounted arranged to be moved to carry the cutter against the exposed side of the blank, and mechanism for giving the carriage such movement.

33. In a needle-making machine, in combination with devices for holding the blank without rotation and for carrying it laterally with step-by-step movement and rest intervals, press mechanism located adjacent to the path of the blank thus carried, having dies adapted to impress the same, mechanism located adjacent to the same path subsequent to the press mechanism comprising gripping-jaws which embrace and grip the blank for a distance both sides of a longitudinal diametric plane thereof and which leave a portion of the blank at one side exposed beyond the plane of the outer surface of the jaws, and mechanism for operating the same constructed and arranged to grip the blank while still held by the carrying device at a rest interval of said carrying movement; a cutter or dressing device and means for operating the same and for moving it toward and from the exposed side of the blank held by such gripping device during the same rest interval.

34. In a needle-making machine, mechanism for forming one end portion of the needle comprising a holder which grasps the blank by the other end and carries it bodily laterally; a pair of gripping-jaws which embrace and grip the blank for a distance both sides of a longitudinal diametric plane thereof, leaving a portion at one side of the blank exposed beyond the plane of the outer surface of the jaws; suitable mechanism for operating said gripping-jaws to cause them thus to grip the blank; a cutter or dressing device and a movable carriage on which such cutter is mounted constructed and arranged to be moved to carry the cutter against the exposed side of the blank; mechanism for operating the cutter and giving the carriage such movement actuated in the same train with the mechanism for actuating the gripping-jaws, and timed to advance the cutter against said exposed side of the blank while the jaws are closed on the latter.

35. In a needle-making machine, a mechanism for forming one end of the blank comprising a holder which grasps the blank by the other end and carries it bodily; a pair of gripping-jaws having recesses in their opposite faces adapted to afford seats for the blank, such recesses extending entirely across said opposed faces immediately adjacent to the end thereof, whereby the blank grasped between the jaws may expose its end and one side at the outer side and end respectively of the jaws; a cutter or dressing device having a face conformed to the outline to be produced upon the gripped end of the blank, and mechanism for moving the carriage to advance such conformed face against the exposed side and end of the blank, said mechanism being operated in the same train with the mechanism for operating the jaws and timed to so advance the cutter while the jaws are closed upon the blank.

36. In a needle-making machine, in combination with a carrier having suitable devices for holding the blanks with one end protruded; mechanism for moving the carrier to carry the blanks laterally with step-by-step movement; suitable mechanism located adjacent to the path of such movement for impressing the blanks on the protruded end to form the outline of the head; mechanism for laterally dressing the blanks about the head located subsequent to the impressing devices, consisting of a pair of jaws which embrace and grip the blank for a distance both sides of a longitudinal diametric plane thereof, and which leave a portion of the blank at one side exposed beyond the plane of the outer surface of the jaws; means for opening and closing the jaws; a dressing device having a dressing movement transverse to the plane of travel of the blank, and mechanism for advancing such dressing device bodily against the side of the blank while the same is held by the jaws, said mechanism being timed so as to be operated during the rest interval of the carrier's movement.

37. In a needle-making machine in combination with a device for holding the blanks without rotation, and carrying them laterally with step-by-step movement and rest intervals, press mechanism located adjacent to the path of the blanks thus carried having dies adapted to impress the outline of the head, other mechanism located adjacent to the same path subsequent to the press mechanism comprising jaws adapted to grip the blanks while held by the carrying device, means for operating said jaws during the rest interval, the jaws having recessed faces affording seats for the blanks immediately adjacent to the ends of the jaws, whereby the blanks grasped therein expose beyond the end of the jaws, any lateral bur or fin left by the impressing-dies, a grinding or dressing device, and means for operating the same and for moving the dressing device into and out of the path of movement of the blank, and laterally against the same at the end of the gripper to dress away the fin during the rest interval.

38. In a needle-making machine in combination with a carrier having a step-by-step motion with rest intervals, a plurality of devices thereon for holding the blanks without rotation, said holding devices being arranged on the carrier successively in the direction of the path of its carrying movement, press mechanism located adjacent to the path of the blanks having dies adapted to impress the outlines of the head, gripping-jaws located adjacent to the same path subsequent to the press mechanism having their gripping-faces provided with two seats for the blanks separated by a distance corresponding to the distance between blanks on the carrier, whereby two blanks may be simultaneously gripped by the jaws; mechanism for operating the jaws at a rest interval; a duality of dressing devices, means for operating the same and for moving them into and out of the path of the blanks and laterally against the blanks held in the two seats of the jaws at opposite sides of said blanks respectively, said mechanism being operated during the rest interval of the step movement.

39. In a needle-making machine in combination with a carrier and holders thereon for blanks to be carried laterally thereby, mechanism for giving to the carrier step-by-step movement with rest intervals, opposed jaws I' and I² located adjacent to the path of the blanks thus carried, grippers therein adapted to grasp the blanks, leaving opposite sides exposed beyond the plane of the outer faces of the jaws respectively, and dressing devices adapted to be advanced laterally from opposite directions to the opposite exposed sides of the blanks thus grasped, mechanism for opening and closing the jaws, and for advancing and retracting the dressing devices timed to operate during the rest interval of the carrier.

40. In a needle-making machine in combination with a blank-holder and means for actuating it to cause it to carry the blank laterally without rotation of such blank, mechanism for dressing the blank laterally, comprising a pair of jaws and grippers in said jaws respectively, provided with facing grooves immediately adjacent to the ends of their facing surfaces adapted to afford lodgment for the blanks in such manner that they are exposed at one side beyond plane of the outer surface of that side of the grippers, means for closing the jaws and holding them closed during the interval of rest of the carrier and dressing devices adapted to operate upon the side of the blank exposed beyond the jaw, means for advancing such dressing devices, laterally with respect to the blank, toward said outer surface of the grippers.

41. In combination with mechanism for holding the needle-blanks and carrying them laterally with step-by-step movement and rest intervals; dies located adjacent to the path of the blanks for impressing them transversely to the plane of their travel during the rest intervals of such travel to form the outline of the head, whereby the surplus material is forced into a fin or bur projecting in the plane of travel; jaws which grasp the head at the portion at which the fin protrudes, leaving the fin exposed; a cutter for dressing the fin, and mechanism for carrying it into and out of the path of travel of the blank to attack the fin and withdraw and timed to operate in the rest intervals of the carrier's movement; said mechanism being constructed and arranged to advance the cutter rapidly while it is passing into the path of movement of the blank and until it is near the blank and then to advance it very slowly during the time it is acting upon the same; whereby the cutter does its work on the blank and clears the path without prolonging the rest interval.

42. In combination with means for gripping the blank in the jaws I' and I², a cutter, as I⁷, and mechanism for advancing it laterally to attack the blank, said mechanism being constructed and arranged to advance the cutter rapidly until it is near the blank, and then to advance it very slowly during the time it is acting upon the blank.

43. In combination with the jaws I' I² constructed and arranged to grasp the blank, the carriages and cutters journaled thereon, the shaft having the cam-abutment $g^{50}$ and the cam-lever 116 coöperating therewith and connection by which the cam-lever operates the movable carriages, said cam-abutment having the concentric portion $g^{53}$ corresponding to the period of movement of the carrier, and the eccentric portion having the extremity $g^{55}$ arranged to collide with the lever while extending toward the fulcrum thereof to rapidly move the carriages toward the jaws, and the slightly eccentric remote extremity $g^{51}$ arranged to rotate in contact with the lever at the closing part of the inward movement of the carriage to advance the cutter slowly while operating on the blank.

44. In combination with the jaws I' and I² which are arranged to grasp the head of the blank and the cutter I⁷ adapted to dress away the exposed parts, the carriage for such cutter and mechanism for advancing it toward the blank; the shaft $g$ and the cam $g^4$ thereon, and lever mechanism actuated by the cam which respectively close the jaws and advance the cutter, whereby the relation between said two actions is rendered invariable.

45. In combination substantially as set forth, the shaft $g$ a cam-abutment $g^{50}$ thereon, and the cam-lever 116 coöperating with the cam-abutment, the rock-shaft $p$, and the link which connects an arm thereof with the cam-lever, the horizontal lever having the arm 108 and a spring connected to such lever tending to hold said arm in operative relation to the lever-arm of the rock-shaft; shaft-carriages having vertical spindles; fixed bearings in which said spindles are seated, dressing devices having their shafts journaled in the shaft-carriages respectively; lever-arms on said spindles and links which connect the lever-arms respectively with opposite arms of said horizontal levers, whereby the dressing devices derive movement bodily simultaneously in opposite directions.

46. In combination with the rock-shaft $p$ and suitable means for rocking it, a frame having a fixed jaw $I^2$, a pair of shaft-carriages each having a spindle or stem at right angles to the shaft-bearings, and seated vertically in said frame, dressing devices having their shafts journaled in said shaft or carriages; lever-arms at the lower ends of the spindles; a horizontally-operating lever suitably fulcrumed, and links from the lever-arms of the spindles respectively to the opposite arm of said lever; a hinged jaw and a link-bolt for closing it upon the fixed jaw; a vertically-operating lever which engages said link-bolt to operate the same, said rock-shaft having two lever-arms which respectively actuate said horizontal and vertical operating-levers; whereby the rock-shaft both closes the jaws and swings the dressing devices to working position.

47. In a needle-making machine in combination with the carrier and the holder thereof for the blank to be carried laterally thereby, a mechansm for forming such blanks laterally comprising a carriage constructed and arranged to swing about a pivoted axis at right angles to the axis of the blank; a forming device mounted on such carriage having a face conformed to the longitudinal outline to be produced on the blank, such face being situated in the plane radial to the pivotal axis of the carriage on the side toward the blank, and a mechanism for swinging the carriage about said pivot, and coöperating stops on the carriage and its support respectively to limit positively the swinging movement by which the forming device is carried toward the blank, one of said stops being adjustable at will.

48. In a needle-making machine in combination with a carrier and means for giving it step-by-step rotation with rest intervals, a chuck mounted radially on such carrier and adapted to be moved radially on its bearings, a shipping-slide engaging the chuck for the purpose of thus moving it, having a finger projecting transversely from the plane of the carrier's rotation, a lever fulcrumed on the table having an arm extended to a point inward from the path described by the finger as the carrier rotates; and suitable means for actuating said lever to force it against the finger and cause it to thrust out the chuck during the rest interval of the carrier.

49. In a needle-making machine, in combination with a rotating carrier; a chuck mounted radially thereon and adapted to be thrust out longitudinally; a shipping-finger or engageable projection suitably connected with the chuck to thrust it out; lever mechanism supported on the frame, constructed and arranged to operate upon said shipping-finger to thrust out the chuck; a rotating shaft; a cam thereon, and operating connections by which such cam actuates the lever mechanism which operates the shipping-finger, the connections between two consecutive parts in said lever mechanism being adjustable to vary at will the extent of the thrusting movement given to the chuck.

50. In combination with the carrier C, means for giving it step-by-step rotation with rest intervals, a chuck thereon, an engageable projection or shipping-finger suitably connected with the chuck to thrust it out longitudinally, such finger extending off the plane of rotation of the carrier transversely thereto; a lever fulcrumed on the frame and extending to a point inward from the path described by the shipping-finger as it rotates with the carrier, a shaft in the train from which the carrier derives movement, a cam on such shaft; operating connections from the lever extending in the path of rotation of an abutment of the cam and a spring operating to hold said parts in operative relation; the cam being constructed and arranged to actuate the lever during the rest interval of the carrier.

51. In combination with the carrier C, a plurality of chucks mounted radially thereon, and adapted to be thrust out longitudinally; engageable projections or shipping-fingers suitably connected with the chucks respectively to thrust them out; mechanism for giving to the carrier step-by-step movement with rest intervals; a lever fulcrumed on the frame having an arm extending to a point inward from the rest position of one of the shipping-fingers; a vertical rock-shaft journaled on the frame having an arm extending to a point inward from the corresponding position of rest of another shipping-finger; a cam on a shaft in the carrier-actuating train; a link connected to the lever and having an abutment in the path of rotation of the cam; suitable means for retaining the abutment against the cam, and for guiding the link longitudinally; the rock-shaft having a second lever-arm and a link connecting arm with the first-mentioned link; whereby the cam actuates simultaneously the lever and the rock-shaft arm to thrust out two chucks simultaneously, the cam-abutment being situated so as to perform its said action at a rest interval with the carrier.

52. The combination with the carrier C, two other carriers adjacent to it at different points in its circumference; chucks on the carrier C adapted to be thrust out longitudinally; an engageable projection or shipping-finger suitably connected with each chuck to thrust it out; a lever fulcrumed on the frame having one arm extending behind the path of rotation of the shipping-fingers to a point in line connecting the center of the carrier C with the center of the preceding carrier; a vertical rock-shaft on the frame, having an arm extending in the rear of the path of the shipping-fingers in a line connecting the center of said carrier with the center of the succeeding carrier; a shaft in the carrier-actuating train and a cam on said shaft; a link connected to one of the first-mentioned links, and having an abutment extending in the path of the cam; a spring actuating upon the link tending to hold the abutment against the cams; the rock-shaft having a second lever-arm and the link extending therefrom to the first-mentioned link whereby the rotation of the cam simultaneously actuates the rock-shaft and the lever to cause their arms respectively to thrust out simultaneously chucks which are in line with the centers of the preceding and following carriers.

53. In combination with the rotating carrier C, and chucks mounted thereon, carriers respectively preceding and succeeding the carrier C, and chucks on such carriers respectively constructed and arranged to deliver blanks to and receive blanks from the chucks on the carrier C, the chucks on the latter carrier being mounted radially with respect to the carrier and adapted to be thrust out longitudinally; shipping-fingers or engageable projections suitably connected to the chucks respectively to thrust them out; two lever mechanisms constructed and arranged to act upon the shipping-fingers of two chucks, respectively, at receiving and delivering positions on said carrier to thrust out said chucks to receive and deliver blanks from and to the chucks on the adjacent carriers; a rotating shaft and a cam thereon located and adapted to actuate both the mechanisms for operating the two shipping-fingers, consecutive parts in each of said mechanisms being provided with connections which are independently adjustable to vary independently the throw of the shipping-fingers, respectively.

54. In combination with the carrier D, the chucks thereon arranged to be thrust out radially; engageable projections or shipping-fingers suitably connected to the chucks respectively to thrust them out; mechanism for giving to the carrier a step-by-step movement with rest intervals; a vertical rock-shaft on the frame having one arm extending behind the path of rotation of said fingers at a point in a line which connects the center of said carrier with the center of the preceding carrier; a delivering mechanism adjacent to said carrier at one of the rest positions of the chucks and a lever fulcrumed on the frame extending behind the path of rotation of the shipping-fingers in line from said delivering mechanism to the center of the carrier, a lever-arm on the rock-shaft arranged to engage and actuate such lever and suitable means for rocking the shaft at the rest intervals of the carriers; whereby a chuck in line with a chuck on the preceding carrier, and a chuck in line with the delivering mechanism are simultaneously thrust out.

55. In a needle-making machine, a press for impressing the head and eye outline, comprising a drop-hammer and a vertical standard in which the same is mounted and vertically guided, a lifting-arm located approximately parallel with the guide-bearing of the drop-hammer, the latter and the lifting-arm having, at their upper ends respectively, abutments constructed and arranged to coöperate to adapt the lifting-arm to thrust the hammer upward; suitable means for giving the lifting-arm an upward thrust, an abutment on the lifting-arm, and a cam on the standard in the path of such abutment constructed and arranged to cause the arm to be disengaged from the hammer when the abutment rides on the cam as the arm is thrust upward, the coöperating abutment of the arm and hammer being suitably formed to permit the abutment on the arm to pass the abutment on the hammer, as the arm descends, whereby the arm may become reëngaged with the hammer.

56. In a needle-making machine, a press for pressing the head and eye outline, comprising a drop-hammer and a vertical standard in which the same is mounted and vertically guided, a lifting-arm located approximately parallel with the guide-bearing of the drop-hammer, the latter and the lifting-arm having, at their upper ends respectively, abutments constructed and arranged to coöperate to adapt the lifting-arm to thrust the hammer upward; suitable means for giving the lifting-arm an upward thrust, an abutment on the lifting-arm and a cam on the standard in the path of such abutment constructed and arranged to cause the arm to be disengaged from the hammer when the abutment rides on the cam as the arm is thrust upward, coöperating abutments of the arm and hammer being suitably formed to permit the abutment on the arm to pass the abutment on the hammer, as the arm descends, whereby the arm may become reëngaged with the hammer, the cam being vertically adjustable on the standard to vary at will the point in the lifting movement at which the disengagement of the lifting-arm and hammer occurs whereby the extent of the drop of the hammer is regulated.

57. In a needle-making machine in combination with two rotating carriers having chucks thereon adapted to come into alinement one by one on each carrier as the latter rotate, means for thrusting the alined chuck on one carrier toward the chuck in line with it on the other carrier, a bracket located between the two carriers having an aperture coaxial with the alined chucks, the chuck to be thrust having a pivoted jaw, and an integral ring elastically supported in the aperture of the bracket adapted to receive the chuck which is thrust out and collide at its inner periphery with the pivoted jaw on the chuck and by its elastic support adapted to yield bodily in the direction of the retreat of the chuck to prevent the retention of the chuck by friction of its jaw with said ring.

58. In a needle-making machine in combination with two rotating carriers having synchronous step-by-step movement, the chucks on the carriers adapted to come into alinement one by one on each carrier as the carriers come to rest in the interval of their step movement, means for thrusting the alined chuck on one carrier toward the chuck in line with it on the other, a bracket located between the two carriers, having an aperture coaxial with the alined chucks, the chuck to be thrust having a pivoted jaw, a ring mounted loosely in the aperture of the bracket adapted to receive the chuck thrust out and collide at its inner periphery with the pivoted jaw to open the same, springs between the ring and the bracket secured to one of said parts and engaging notches in the other to prevent the rotation of the ring and operating to hold the same elastically as respects movement in the line of thrust and retreat of the chuck adapted to permit the ring to yield in the direction of the retreat of the chuck to break the frictional grasp between the latter and the ring.

59. In combination with a carrier and holder thereon for the blanks to be carried laterally thereby, arranged to be rotated while being thus carried and mechanism for thus rotating them and thereby rotating the blanks; a rotating cutter arranged adjacent to the path of the blanks and adapted to operate on them as they move past the cutter, said cutter having its axis throughout the whole length thereof extending away from the path of movement of the blank; whereby the operating-surface of the cutter is oblique to the entire path of the needle over it.

60. In a needle-machine in combination with the carrier by which the blanks are carried laterally while protruding radially and rotating about their axes, cutters or grinders mounted adjacent to the path of the blanks in position to operate upon their protruded ends comprising a plurality of cutters of small diameter mounted with their axes slightly oblique to the path of the blank, and a subsequent cutter or grinder of relatively large diameter mounted with its axis making an acute angle with a plane radial to the carrier, the plane of rotation of the large cutter being divergent outward from the path of the blanks on the side from which they approach.

61. In combination with the rotating carrier, chucks thereon for carrying blanks with one end protruded, a mechanism for rotating the chucks about their respective axes while the carriage rotates; a plurality of rotating cutters or dressing-wheels located adjacent to the path of the protruding ends of the blanks, the first of such cutters being located with its axis trending away from the path of the blanks at the side from which they approach and subsequent cutters having their axes trending slightly away from such path at the side at which they depart.

62. In a needle-making machine in combination with the mechanism for carrying blanks step by step, for forming their opposite ends, and for delivering the needles one for each step of said carrying movement when completed; a straightening mechanism operating by stages or steps; mechanism which actuates the same constructed and arranged to perform one complete stage or step of such straightening operation for each step action of the needle-delivering devices.

63. In a needle-making machine in combination with the carrier, mechanisms which respectively carry the needle-blank protruding at opposite ends, mechanisms for operating upon the opposite ends to form the head and eye at one end respectively, and the point at the other end; devices for delivering the needle from the carrying devices after the completion of such process and the straightening mechanism located at the discharge side of such delivering devices constructed and arranged to receive and operate upon the blanks one by one as they are thus delivered.

64. In a needle-making machine in combination with mechanism for forming needles, and delivering them one by one when thus formed, a straightening mechanism comprising a moving body whose surface is made up of a plurality of elements or sections arranged successively and separated by short steps or shoulders, a shoe or pressure-plate pressed elastically against such stepped body at the side at which the shoulders face upward, and diverging therefrom to form therewith a trough or hopper to receive the needle-blanks, and mechanism for moving such body downward at the side adjacent to the plate, whereby the shoulders face backward in respect to the direction of rotation to roll the needle between said parts.

65. In a machine for making needles and like articles, a straightening mechanism consisting of a rotating body in general of cylindrical form, but having its quasicylindrical surfaces made up of a plurality of slightly-eccentric surfaces separated by short abrupt steps, and a shoe or pressure-plate yieldingly pressed against such body at the side at which the shoulders face upward and diverging therefrom to form therewith a trough to receive the needles, mechanism for rotating said body downward at said side to roll the needles between the same and the shoe.

66. In a machine for making needles and similar articles, a straightening mechanism consisting of a rotating body or roller which is in general cylindrical, but which has its quasi-cylindrical surface interrupted by a short radial jog or step, to the bottom and top of which the adjacent curved parts of the surface lead without abruptness, and a shoe or pressure-plate yieldingly pressed against the curved surface and approximately conformed thereto for a distance, and extending off substantially tangentially therefrom to form a trough to receive the needles and mechanism for rotating such roller inward with respect to the trough at the side toward the pressure-plate with the steps or shoulders facing outward with respect to the trough.

67. In a needle-making machine in combination with the devices for forming the needles and delivering them one by one when formed, a straightening mechanism constituting a shaft or roller whose peripheral surface is made up of a succession of slightly-eccentric curves and intervening abrupt shoulders, and a shoe arranged to be elastically pressed against such eccentrically-surfaced shaft, mechanism for rotating the shaft with step-by-step movement, each step movement corresponding to the angular extent of the one of said eccentric elements of the surface, and in time, corresponding to the delivering movements of the needle-delivering devices, whereby each such eccentric element of the shaft receives and operates upon only one needle at a time.

68. In combination with the carrier B having holders for blanks carried thereby without rotation of the blank; a mechanism located adjacent to the path of the blank for piercing the eye, and a mechanism also adjacent to the same path for laterally finishing the head; a cam on the carrier-actuating shaft having an abutment $q^{50}$; a rock-shaft $p$ journaled on the frame; link and lever mechanism operated by said cam to operate said rock-shaft; three lever-arms on said rock-shaft the first engaging the reciprocating head of the eye-piercing press, the second engaging the jaw-operating mechanism of the lateral dressing devices; the third engaging the operating mechanism which controls the movement of the lateral dressing devices.

69. In a needle-making machine, in combination with the mechanism for feeding in the wire with a thrusting movement; a chuck adapted to receive the wire so thrust in and provided with suitable means for grasping the wire after it is received; a severing device operating between the wire-feeding device and the chuck to cut off the wire received by the chuck from the running wire; and a guard or shoe adjacent to the path of the thrust of the wire into the chuck constructed and arranged to stay the wire against the tendency of the severing device to spring or bend it.

70. In a needle-making machine, in combination with the wire-feeding mechanism adapted to thrust the wire endwise, a chuck into which the wire is thus thrust provided with means for grasping it after it is received, a wire-severing device in the nature of a shear comprising a fixed cutter and a movable cutter, and a shoe or guard located adjacent to the path of thrust of the wire between the severing device and the chuck and on opposite sides of the path from that at which the fixed cutter stands; whereby the tendency of the moving cutter to bend or spring the wire over the fixed cutter as a fulcrum is resisted.

In testimony whereof witness my hand, at Chicago, Illinois, this 24th day of September, 1898.

EUGENE FONTAINE.

In presence of—
CHAS. S. BURTON,
JEAN ELLIOTT.